United States Patent
Krishnamurthy et al.

(10) Patent No.: US 7,940,740 B2
(45) Date of Patent: May 10, 2011

(54) APPARATUS AND METHOD FOR COMMUNICATING AND PROCESSING A POSITIONING REFERENCE SIGNAL BASED ON IDENTIFIER ASSOCIATED WITH A BASE STATION

(75) Inventors: Sandeep H. Krishnamurthy, Arlington Heights, IL (US); Robert T. Love, Barrington, IL (US); Ajit Nimbalker, Arlington Heights, IL (US); Kenneth A. Stewart, Grayslake, IL (US); Xiangyang Zhuang, Lake Zurich, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 0 days.

(21) Appl. No.: 12/365,166

(22) Filed: Feb. 3, 2009

(65) Prior Publication Data

US 2010/0195566 A1 Aug. 5, 2010

(51) Int. Cl.
*H04B 7/208* (2006.01)
*H04B 7/216* (2006.01)
*H04W 4/00* (2009.01)
*H04J 3/00* (2006.01)
*G01R 31/08* (2006.01)

(52) U.S. Cl. ........ 370/344; 370/329; 370/339; 370/320; 370/345; 370/235; 455/436; 455/442; 455/450; 455/456.3; 375/267; 709/230; 718/104

(58) Field of Classification Search .............. 370/344, 370/329, 330, 320, 345, 235, 225, 343; 709/230; 455/436, 442, 450, 456.3; 718/104; 375/267
See application file for complete search history.

(56) References Cited

U.S. PATENT DOCUMENTS

| | | | |
|---|---|---|---|
| 5,848,357 A | 12/1998 | Dehner et al. | |
| 7,639,660 B2 * | 12/2009 | Kim et al. | 370/343 |
| 2005/0135324 A1 * | 6/2005 | Kim et al. | 370/343 |
| 2006/0019677 A1 * | 1/2006 | Teague et al. | 455/456.3 |
| 2006/0209754 A1 * | 9/2006 | Ji et al. | 370/329 |

(Continued)

FOREIGN PATENT DOCUMENTS

WO WO 2008033117 A1 3/2008

(Continued)

OTHER PUBLICATIONS

Qualcomm Europe, *On OTDOA in LTE*, Contribution R1-090353 to 3GPP TSG-RAN WG1 #55bis, Jan. 12-19, 2009, Ljubljana, Slovenia (8 pages).

(Continued)

*Primary Examiner* — William D Cumming

(57) ABSTRACT

A base station communicates a positioning reference signal (PRS) to wireless communication devices over a downlink in a wireless communication system by encoding a PRS into a first set of transmission resources, encoding other information into a second set of transmission resources, multiplexing the two sets of resources into a subframe such that the first set of resources is multiplexed into at least a portion of a first set of orthogonal frequency division multiplexed (OFDM) symbols based on an identifier associated with the base station and the second set of resources is multiplexed into a second set of OFDM symbols, and transmitting the subframe. Upon receiving the subframe, a wireless device determines which set of transmission resources contains the PRS based on the identifier associated with the base station that transmitted the subframe and processes the set of resources containing the PRS to estimate timing (e.g., time of arrival) information.

29 Claims, 8 Drawing Sheets

U.S. PATENT DOCUMENTS

| | | | |
|---|---|---|---|
| 2006/0256887 A1* | 11/2006 | Kwon et al. | 375/260 |
| 2006/0291393 A1* | 12/2006 | Teague et al. | 370/235 |
| 2007/0049280 A1* | 3/2007 | Sambhwani et al. | 455/442 |
| 2007/0133462 A1 | 6/2007 | Guey | |
| 2007/0223422 A1* | 9/2007 | Kim et al. | 370/334 |
| 2008/0089312 A1* | 4/2008 | Malladi | 370/345 |
| 2008/0095109 A1* | 4/2008 | Malladi et al. | 370/330 |
| 2008/0133462 A1 | 6/2008 | Aylward et al. | |
| 2008/0167040 A1* | 7/2008 | Khandekar et al. | 455/436 |
| 2008/0170602 A1 | 7/2008 | Guey | |
| 2008/0170608 A1 | 7/2008 | Guey | |
| 2008/0212520 A1* | 9/2008 | Chen et al. | 370/320 |
| 2008/0267310 A1* | 10/2008 | Khan et al. | 375/267 |
| 2008/0307427 A1* | 12/2008 | Pi et al. | 718/104 |
| 2009/0041151 A1* | 2/2009 | Khan et al. | 375/267 |
| 2009/0061887 A1* | 3/2009 | Hart et al. | 455/450 |
| 2009/0122758 A1* | 5/2009 | Smith et al. | 370/330 |
| 2009/0228598 A1* | 9/2009 | Stamoulis et al. | 709/230 |
| 2009/0238131 A1* | 9/2009 | Montojo et al. | 370/329 |
| 2009/0262699 A1* | 10/2009 | Wengerter et al. | 370/330 |
| 2009/0268675 A1* | 10/2009 | Choi | 370/329 |
| 2009/0285321 A1* | 11/2009 | Schulz et al. | 375/267 |
| 2010/0046460 A1* | 2/2010 | Kwak et al. | 370/329 |
| 2010/0046494 A1* | 2/2010 | Palanki et al. | 370/344 |
| 2010/0056166 A1* | 3/2010 | Tenny | 455/450 |
| 2010/0172311 A1 | 7/2010 | Agrawal et al. | |
| 2010/0182903 A1* | 7/2010 | Palanki et al. | 370/225 |
| 2010/0195566 A1* | 8/2010 | Krishnamurthy et al. | 370/328 |

FOREIGN PATENT DOCUMENTS

WO WO-2008/137607 A2 11/2008

OTHER PUBLICATIONS

3rd Generation Partnership Project, "3GPP TS 36.211 V8.4.0; 3rd Generation Partnership Project; Technical Specification Group Radio Access Network; Evolved Universal Terrestrial Radio Access (E-UTRA); Physical Channels and Modulation (Release 8)", 3GPP Organizational Partners (ARIB, ATIS, CCSA, ETSI, TIA, TTC), Sep. 2008, pp. 1-78.

Costas, John P., "A Study of a Class of Detection Waveforms Having Nearly Ideal Range-Doppler Ambiguity Properties", Proceedings of the IEEE, vol. 72, No. 8, Aug. 1984, pp. 996-1009.

Guey, Jiann-Ching, "Syncronization Signal Design for OFDM Based On Time-Frequency Hopping Patterns", IEEE, ICC 2007 Proceedings, IEEE Communications Society, 2007, pp. 4329-4334.

3GPP TSG RAN#42, "Positioning Support for LTE", RP-080995, Athens, Greece, Dec. 2-5, 2008, pp. 1-5.

Ericsson, "Reference Signals for Low Interference Subframes in Downlink", 3GPP TSG RAN WG1 Meeting #56bis, R1-091314, Seoul, South Korea, Mar. 23-27, 2009, pp. 1-8.

Motorola, "Positioning Subframe Muting for OTDOA Measurements", 3GPP TSG RAN1 #58, R1-093406, Shenzhen, China, Aug. 24-28, 2009, pp. 1-9.

Larsson, Daniel, "LS on assistance information for OTDOA positioning support for LTE", 3GPP TSG RAN WG1 Meeting #58, R1-093729, Shenzhen, China, Aug. 24-28, 2009, pp. 1-3.

* cited by examiner

APPARATUS AND METHOD FOR COMMUNICATING AND PROCESSING A POSITIONING REFERENCE SIGNAL BASED ON IDENTIFIER ASSOCIATED WITH A BASE STATION

FIELD OF THE INVENTION

The present invention relates generally to wireless communication networks and, more particularly, to an apparatus and method for communicating and processing positioning reference signals in a downlink subframe based on an identifier associated with a base station transmitting the subframe.

BACKGROUND

Wireless communication networks are well known. Some networks are completely proprietary, while others are subject to one or more standards to allow various vendors to manufacture equipment for a common system. One such standards-based network is the Universal Mobile Telecommunications System (UMTS). UMTS is standardized by the Third Generation Partnership Project (3GPP), a collaboration between groups of telecommunications associations to make a globally applicable third generation (3G) mobile phone system specification within the scope of the International Mobile Telecommunications-2000 project of the International Telecommunication Union (ITU). Efforts are currently underway to develop an evolved UMTS standard, which is typically referred to as UMTS Long Term Evolution (LTE) or Evolved UMTS Terrestrial Radio Access (E-UTRA).

According to Release 8 of the E-UTRA or LTE standard or specification, downlink communications from a base station (referred to as an "enhanced Node-B" or simply "eNB") to a wireless communication device (referred to as "user equipment" or "UE") utilize orthogonal frequency division multiplexing (OFDM). In OFDM, orthogonal subcarriers are modulated with a digital stream, which may include data, control information, or other information, so as to form a set of OFDM symbols. The subcarriers may be contiguous or discontiguous and the downlink data modulation may be performed using quadrature phase shift-keying (QPSK), 16-ary quadrature amplitude modulation (16QAM), or 64QAM. The OFDM symbols are configured into a downlink subframe for transmission from the base station. Each OFDM symbol has a time duration and is associated with a cyclic prefix (CP). A cyclic prefix is essentially a guard period between successive OFDM symbols in a subframe. According to the E-UTRA specification, a normal cyclic prefix is about five (5) microseconds and an extended cyclic prefix is 16.67 microseconds.

In contrast to the downlink, uplink communications from the UE to the eNB utilize single-carrier frequency division multiple access (SC-FDMA) according to the E-UTRA standard. In SC-FDMA, block transmission of QAM data symbols is performed by first discrete Fourier transform (DFT)-spreading (or precoding) followed by subcarrier mapping to a conventional OFDM modulator. The use of DFT precoding allows a moderate cubic metric/peak-to-average power ratio (PAPR) leading to reduced cost, size and power consumption of the UE power amplifier. In accordance with SC-FDMA, each subcarrier used for uplink transmission includes information for all the transmitted modulated signals, with the input data stream being spread over them. The data transmission in the uplink is controlled by the eNB, involving transmission of scheduling requests (and scheduling information) sent via downlink control channels. Scheduling grants for uplink transmissions are provided by the eNB on the downlink and include, among other things, a resource allocation (e.g., a resource block size per one millisecond (ms) interval) and an identification of the modulation to be used for the uplink transmissions. With the addition of higher-order modulation and adaptive modulation and coding (AMC), large spectral efficiency is possible by scheduling users with favorable channel conditions.

E-UTRA systems also facilitate the use of multiple input and multiple output (MIMO) antenna systems on the downlink to increase capacity. As is known, MIMO antenna systems are employed at the eNB through use of multiple transmit antennas and at the UE through use of multiple receive antennas. A UE may rely on a pilot or reference symbol (RS) sent from the eNB for channel estimation, subsequent data demodulation, and link quality measurement for reporting. The link quality measurements for feedback may include such spatial parameters as rank indicator, or the number of data streams sent on the same resources; precoding matrix index (PMI); and coding parameters, such as a modulation and coding scheme (MCS) or a channel quality indicator (CQI). For example, if a UE determines that the link can support a rank greater than one, it may report multiple CQI values (e.g., two CQI values when rank=2). Further, the link quality measurements may be reported on a periodic or aperiodic basis, as instructed by an eNB, in one of the supported feedback modes. The reports may include wideband or subband frequency selective information of the parameters. The eNB may use the rank information, the CQI, and other parameters, such as uplink quality information, to serve the UE on the uplink and downlink channels.

As is also known, present-day cellular telephones include global positioning system (GPS) receivers to assist in locating the devices and their owners in the event of an emergency and to comply with E-911 mandates from the Federal Communication Commission (FCC). Under most circumstances, the phone's GPS receiver can receive signals from the appropriate quantity of GPS satellites and convey that information to the cellular system's infrastructure for determination of the device's location by, for example, a location server coupled to or forming part of the wireless network. However, there are some circumstances under which the GPS receiver is ineffective. For example, when a user and his or her cell phone are located within a building, the GPS receiver may not be able to receive signals from an appropriate quantity of GPS satellites to enable the location server to determine the device's position. Additionally, wireless devices in private systems are not required to meet the FCC E-911 mandates and may not include a GPS receiver. However, circumstances may arise under which determining locations of wireless devices operating in such systems may be necessary.

To compensate for the intermittent ineffectiveness of the GPS system and to provide location-determining capabilities in private systems, many wireless systems utilize signaling and include processes through which a wireless device's location can be estimated. For example, in many systems, base stations regularly transmit positioning reference signals that are received by the wireless devices and used either to determine information based upon which an infrastructure device, such as a location server, can compute (e.g., via triangulation and/or trilateration) the wireless device's location or to determine the location of the wireless device autonomously (i.e., at the wireless device itself). When a location server is intended to compute the wireless device's location, the wireless device may determine time of arrival (TOA) or time difference of arrival (TDOA) information upon receiving the positioning reference signal and communicate the TOA or TDOA to the location server via a serving base station (i.e., a base station providing wireless communication service to the wireless device). The TOA or TDOA information is typically determined based on an internal clock of the wireless device as established by the wireless device's local oscillator in accordance with known techniques.

Contribution R1-090353 to the 3GPP Radio Access Network (RAN) Working Group 1 (3GPP RAN) provides one approach for developing downlink subframes for use in conveying positioning reference signals to UEs in E-UTRA systems. According to Contribution R1-090353, QPSK symbols containing the positioning reference signal are distributed throughout OFDM symbols that are not allocated to control information such that two resource elements per OFDM symbol carry the positioning reference symbols. FIG. 1 illustrates exemplary downlink subframes 101, 103 transmitted by eNBs serving cells neighboring the cell in which the UE is currently operating. As illustrated, each subframe 101, 103 includes a resource block of twelve subcarriers ($sub_0$ through $sub_{11}$), each of which is divided into twelve time segments ($t_0$ through $t_{11}$). Each time segment on a particular subcarrier is a resource element 102, 104, which contains a digitally modulated (e.g., QPSK, 16QAM or 64 QAM) symbol. A set of resource elements 102, 104 spread across all the subcarriers during a particular segment or duration of time forms an OFDM symbol. A set of OFDM symbols (twelve as illustrated in FIG. 1) forms each subframe 101, 103.

In the illustrated subframes 101, 103, the first two OFDM symbols of each subframe 101, 103 include cell-specific reference symbols (denoted "CRS" in the subframes 101, 103) and other control information (denoted as "C" in the subframes 101, 103) and the remaining OFDM symbols contain the positioning reference signal encoded as symbols into two resource elements 102 of each OFDM symbol. The resource elements 102, 104 containing the positioning reference signal are denoted "PRS" in the subframes 101, 103. The eNBs transmitting the subframes 101, 103 are controlled by one or more controllers in an attempt to maintain orthogonality of the arrangement of the positioning reference signals within the non-control portions of the subframes 101, 103 by insuring that the positioning reference signal symbols are multiplexed into non-overlapping resource elements 102, 104. Notwithstanding such intent to maintain orthogonality in this manner, the proposed subframe structure may cause a loss of orthogonality under certain conditions. For example, when using a normal cyclic prefix (CP) for each OFDM symbol in the exemplary subframes 101, 103, an inter-site distance (ISD) of 1.5 kilometers and a channel delay spread of five microseconds can result in a loss of orthogonality between the different eNB transmitters even when they transmit on non-overlapping resource elements 102, 104 as illustrated in FIG. 1. The loss of orthogonality results because the overall delay spread of the downlink channel (i.e., propagation delay plus multipath delay spread) as seen from the UE exceeds the CP length for normal CP (approximately five microseconds) and, therefore, DFT precoding is non-orthogonal. For the case of an extended CP (approximately 16.67 microseconds) deployment an ISD of 4.5 km and a channel delay spread of five microseconds can result in loss of orthogonality of subcarrier transmissions.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with one or more embodiments of the present invention.

Figure 1:
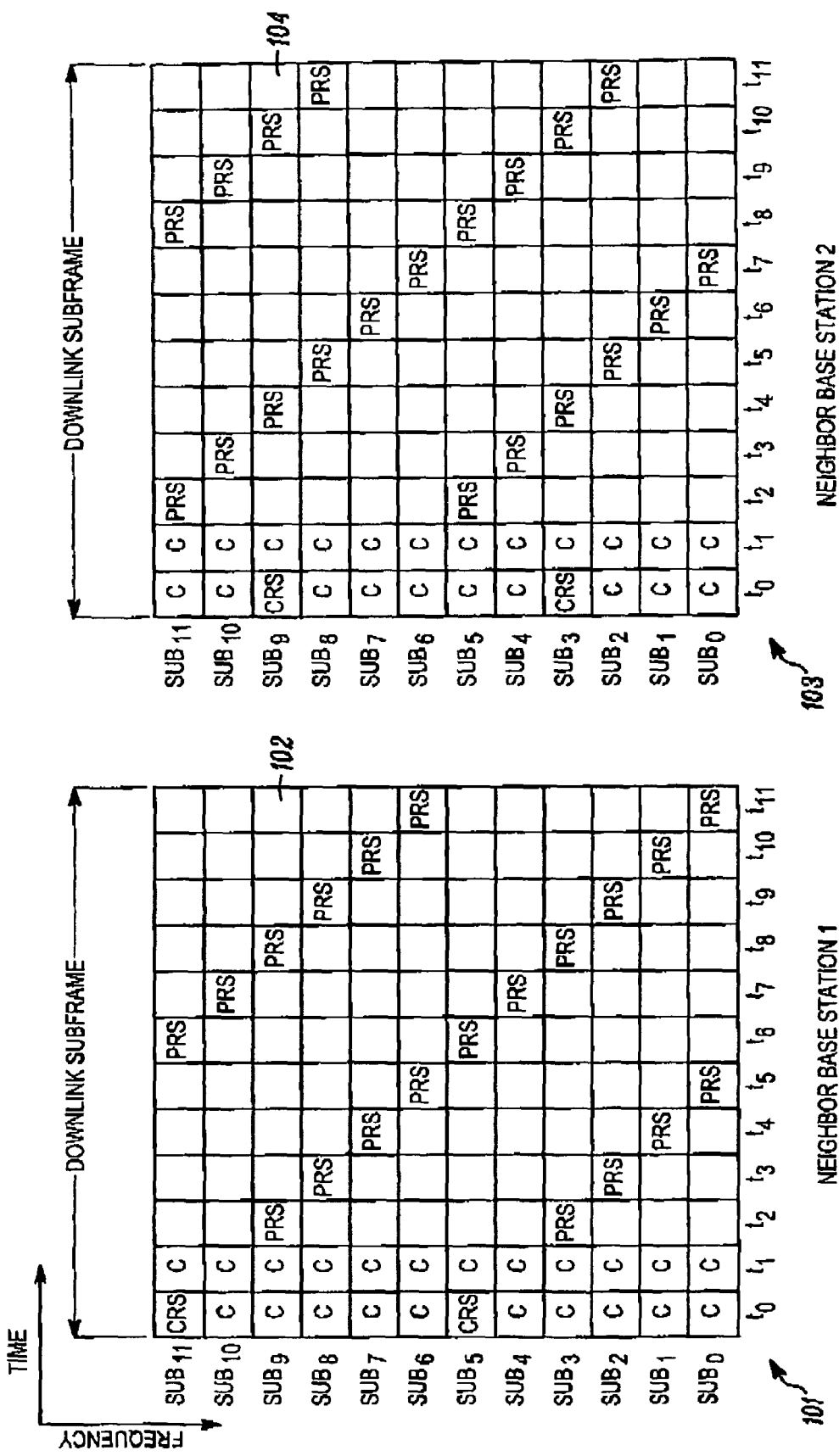
FIG. 1 is an exemplary downlink subframe for transmitting a positioning reference signal from a base station to a wireless communication device in accordance with the E-UTRA standard.

Skilled artisans will appreciate that elements in the figures are illustrated for simplicity and clarity and have not necessarily been drawn to scale or to include every component of an element. For example, the dimensions of some of the elements in the figures may be exaggerated alone or relative to other elements, or some and possibly many components of an element may be excluded from the element, to help improve the understanding of the various embodiments of the present invention.

DETAILED DESCRIPTION

Generally, the present invention encompasses an apparatus and method for communicating positioning reference signals based on an identifier associated with a base station. In accordance with one embodiment, the apparatus is a wireless communication device that includes, inter alia, a receiver and a processor. The receiver is operable to receive at least a section of one or more subframes, which may or may not be time contemporaneous, from one or more base stations (e.g., providing wireless communication service to service coverage areas (e.g., cells) adjacent to a service coverage area in which the wireless communication device is located). Each subframe includes transmission resources (e.g., E-UTRA resource elements) that are divided in time over a symbol across a plurality of subcarriers to form a plurality of orthogonal frequency division multiplexed (OFDM) symbols. Each transmission resource is transmitted for a predetermined amount of time on a respective one of the subcarriers within an OFDM symbol. The OFDM symbols are arranged into at least a first set of OFDM symbols that includes a positioning reference signal (e.g., an observed time difference of arrival (OTDOA) waveform) and a second set of OFDM symbols that does not include a positioning reference signal, but which may optionally include a cell-specific reference signal, control information (e.g., a Physical Downlink Control Channel or PDCCH) and/or data. In one embodiment, each OFDM symbol of at least the first set has a time duration or occupies a time segment that is identical in length. In such an embodiment, each OFDM symbol of at least the first set may have a common or identical cyclic prefix. In another embodiment, a single OFDM symbol may include all the transmission resources that carry the positioning reference signal. Additionally, the OFDM symbols which are time adjacent the OFDM symbol carrying the positioning reference signal may be empty or blank to provide a guard time segment to account for undesired delay spread of the downlink channel.

In an alternative embodiment, the first set of OFDM symbols may be logically divided into at least two subsets such that each OFDM symbol of the first subset (e.g., the OFDM symbols having at least one transmission resource carrying the positioning reference signal) has a time duration greater than each OFDM symbol of the second set (e.g., the OFDM symbols having at least one transmission resource that is not carrying the positioning reference signal). In such an alternative embodiment, the OFDM symbol or symbols carrying the positioning reference signal may have a cyclic prefix greater than the conventional extended cyclic prefix under the E-UTRA standard (e.g., greater than 16.67 microseconds). Additionally, the transmission resources in the OFDM symbols in the second subset of the first set of OFDM symbols may be empty or blank.

In an alternative embodiment, the first set of OFDM symbols may be logically divided into at least two subsets such that each OFDM symbol of the first subset (e.g., the OFDM symbols having at least one transmission resource carrying the positioning reference signal) has a time duration greater than each OFDM symbol of the second subset of OFDM symbols. In such an alternative embodiment, the OFDM symbol or symbols carrying the positioning reference signal may have a cyclic prefix greater than the conventional extended cyclic prefix under the E-UTRA standard (e.g., greater than 16.67 microseconds).

The processor is operable to determine, based on an identifier associated with the base station which transmitted the subframe, a set of transmission resources in which a positioning reference signal was transmitted, wherein the set of transmission resources constitutes a portion (i.e., some, but not all) of the first set of OFDM symbols. In other words, the set of transmission resources containing or carrying the positioning reference signal may be excluded from one or more of the OFDM symbols in the first set of OFDM symbols. The processor is also operable to process the set of transmission resources to estimate timing information associated with the positioning reference signal.

In one embodiment, the processor is operable to determine a time of arrival (TOA) of the positioning reference signal based on reference timing information (e.g., produced from the wireless device's local oscillator) corresponding to a transmission from a particular base station. Further, the processor may be operable to determine a time of arrival of the positioning reference signal transmitted from a second base station based on reference timing information and to compute a time difference of arrival (TDOA) of the positioning reference signal from the second base station relative to the first base station. In such an embodiment, the wireless communication device may further include a transmitter that is operable to communicate at least one of the time of arrival and the time difference of arrival to a location server via a base station that is providing wireless communication service to the wireless communication device.

In an alternative embodiment, the apparatus may be a base station operable to encode, multiplex, and transmit a downlink subframe containing a positioning reference signal, a cell-specific reference signal, and optionally other information, such as control information and/or data. In such an embodiment, the base station includes, inter alia, a processor and a transmitter. The base station processor is operable to encode a positioning reference signal into a first set of transmission resources (e.g., E-UTRA resource elements), encode information other than the positioning reference signal into a second set of transmission resources, and multiplex the first set of transmission resources and the second set of transmission resources into a subframe that includes a plurality of OFDM symbols. The base station transmitter is operable to transmit the subframe to wireless communication devices within a coverage range of the base station.

According to one embodiment, the first set of transmission resources is multiplexed into a portion (i.e., some, but not all, OFDM symbols) of a first set of OFDM symbols of the subframe (e.g., OFDM symbols forming a portion of the subframe that is not used for transmitting control information (e.g., not forming a PDCCH region) and/or data) based on an identifier associated with the base station and the second set of transmission resources is multiplexed into a second set of OFDM symbols of the subframe (e.g., OFDM symbols used for transmitting control information (e.g., a PDCCH) and/or data). In an alternative embodiment, the processor is further operable to encode data into a third set of transmission resources and multiplex the third set of transmission resources into a portion of the second set of OFDM symbols that are not occupied by the second set of transmission resources. As noted above, the OFDM symbols containing transmission resources carrying the positioning reference signal may have a time duration and/or a cyclic prefix equivalent to a time duration and/or a cyclic prefix associated with the OFDM symbols of the second set. Alternatively, the OFDM symbols containing transmission resources carrying the positioning reference signal may have a time duration and/or a cyclic prefix greater than a time duration and/or a cyclic prefix associated with the OFDM symbols of the second set. As a further alternative, the OFDM symbols containing transmission resources carrying the positioning reference signal may have a time duration and/or a cyclic prefix greater than a time duration and/or a cyclic prefix associated with other OFDM symbols of the first set. Further, the first set of transmission resources may be multiplexed into the first set of OFDM symbols such that the transmission resources are multiplexed onto a subset of the subcarriers forming one or more OFDM symbols of the first set of OFDM symbols. For example, the first set of transmission resources may be multiplexed onto one-sixth of the subcarriers forming an OFDM symbol of the first set of OFDM symbols (e.g., every sixth subcarrier may be used for carrying a transmission resource corresponding to the positioning reference signal). Still further, a set of blank or empty transmission resources may be multiplexed into the first set of OFDM symbols such that one or more OFDM symbols formed by the empty transmission resources is temporally adjacent an OFDM symbol carrying the positioning reference signal.

By communicating a positioning reference signal to wireless communication devices in this manner, the present invention insures orthogonality of the OFDM symbols carrying the positioning reference signals which have been transmitted by base stations of neighboring cells or sectors within a cell even under conditions causing substantial downlink channel delay spread as perceived by the wireless device. Typically, the base stations (e.g., eNBs) or neighboring base stations may coordinate to ensure the wireless devices (e.g., UEs) in the region can identify and process the transmitted positioning reference signals to extract the positioning related information. By utilizing less than all of the OFDM symbols in a subset (e.g., the non-control channel portion) of the downlink subframe to convey the positioning reference signal, empty OFDM symbols are made available to absorb the effects of delay spreads that are greater than the cyclic prefix of the OFDM symbols carrying the position reference signal when conventional cyclic prefixes as provided under the E-UTRA standard are used, thereby maintaining the orthogonality of DFT precoding. Alternatively, by increasing the duration of or cyclic prefix associated with the OFDM symbol or symbols carrying the positioning reference signal, such increase in duration or cyclic prefix offsets increased delay spreads incurred under various network conditions and enables the orthogonality of DFT precoding to be maintained.

Figure 2:
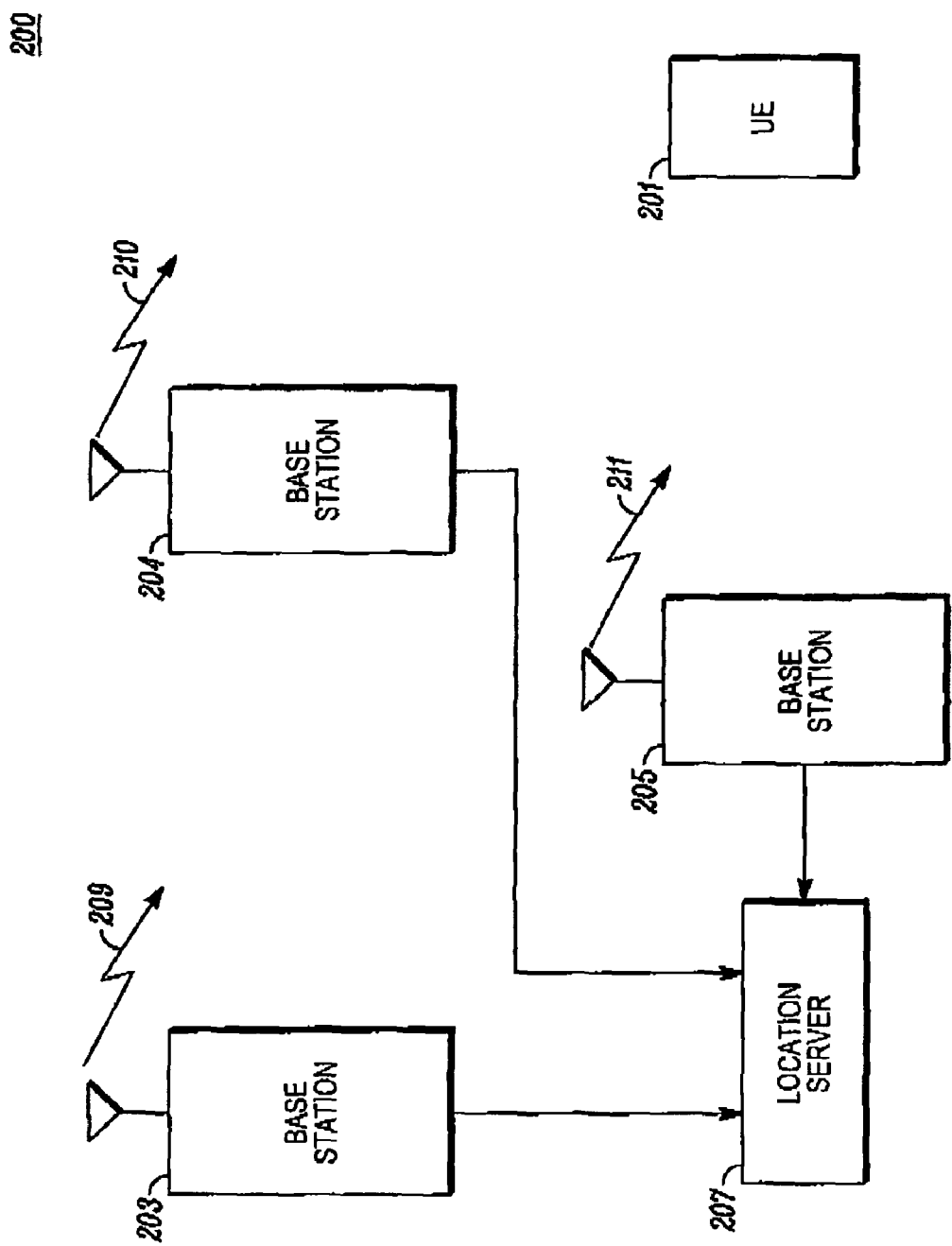
FIG. 2 is an electrical block diagram of a wireless communication system providing wireless communication service to a wireless communication device in accordance with an exemplary embodiment of the present invention.

Embodiments of the present invention can be more readily understood with reference to FIGS. 2-8, in which like reference numerals designate like items. FIG. 2 is an electrical block diagram of a wireless communication system 200 providing wireless communication service to one or more wireless communication devices 201 in accordance with an exemplary embodiment of the present invention. The wireless system 200 includes, inter alia, a plurality of base stations 203-205 (three shown for illustrative purposes), one or more wireless communication devices 201 (one shown for illustrative purposes), and an optional location server 207. Typically, the wireless system would include many other base stations and wireless communication devices. However, for purposes of simplicity in connection with describing the various features of the present invention, FIG. 2 depicts only one three base stations 203-205 and one wireless communication device 201. In one embodiment, the wireless communication system 200 is a system that implements the E-UTRA standard. Alternatively, the wireless system 200 may be any system that utilizes orthogonal frequency division multiplexing and enables wireless devices 201 to autonomously determine their location or position within the system 200 or absolutely, or assist with such location determination by, for example, reporting timing information (e.g., time of arrival (TOA) or time difference of arrival (TDOA) information) to the location server 207.

The wireless communication device 201 may be implemented as a mobile telephone, a smart phone, a text messaging device, a handheld computer, a wireless communication card, a personal digital assistant (PDA), a notebook or laptop computer, a consumer premises equipment (CPE), or any other communication device that has been modified or fabricated to include the functionality of the present invention. A smart phone is a mobile telephone that has additional application processing capabilities. For example, in one embodiment, a smart phone is a combination of (i) a pocket personal computer (PC), handheld PC, palm top PC, or PDA, and (ii) a mobile telephone. Exemplary smart phones are the iPHONE™ available from Apple, Inc. of Cupertino, Calif. and the MOTOROLA Q™ available from Motorola, Inc. of Schaumburg, Ill. A wireless communication card, in one embodiment, resides or is insertable within a PC or a laptop computer. The term "wireless communication device," as used herein and the appended claims, is intended to broadly cover many different types of devices that can receive and/or transmit signals and that can operate in a wireless communication system. For example, and not by way of limitation, a wireless communication device can include any one or a combination of the following: a cellular telephone, a mobile phone, a smart phone, a two-way radio, a two-way pager, a wireless messaging device, a laptop/computer, an automotive gateway, a residential gateway, a personal computer, a server, a PDA, CPE, a router, a cordless telephone, a wireless email device, a portable gaming device including a built-in wireless modem, and the like. An electrical block diagram of an exemplary wireless communication device 201 is illustrated in FIG. 3.

The base stations 203-205 provide wireless communication service within respective geographic service coverage areas (e.g., cells). The base stations 203-205 may be co-located or diversely located. When co-located, the base stations 203-205 may provide wireless service to respective portions (e.g., sectors) of a single service coverage area (e.g., a cell). In one embodiment, the base stations are eNBs that operate in accordance with the E-UTRA standard.

The location server 207 is well known and is used to determine locations of wireless communication devices 207 within the wireless communication system 200. In one embodiment, the location server 207 uses triangulation or trilateration to locate a wireless communication device 201 based on known locations of base stations 203-205 within the system 200 together with time of arrival or time difference of arrival measurements made and reported by the wireless communication device 201 in response to receiving subframes carrying positioning reference signals 209-211 from the base stations 203-205. Locations determined by the location server 207 may be used for a variety of reasons, including to locate a wireless device that has made an emergency call when such device does not include GPS functionality or when GPS functionality is inoperable or impaired for any reason. While the location server 207 is shown as a distinct entity from the base stations 203-205, use of a separate location server 207 is not necessary as certain base stations can also provide the logical functionality of a location server 207.

Figure 3:
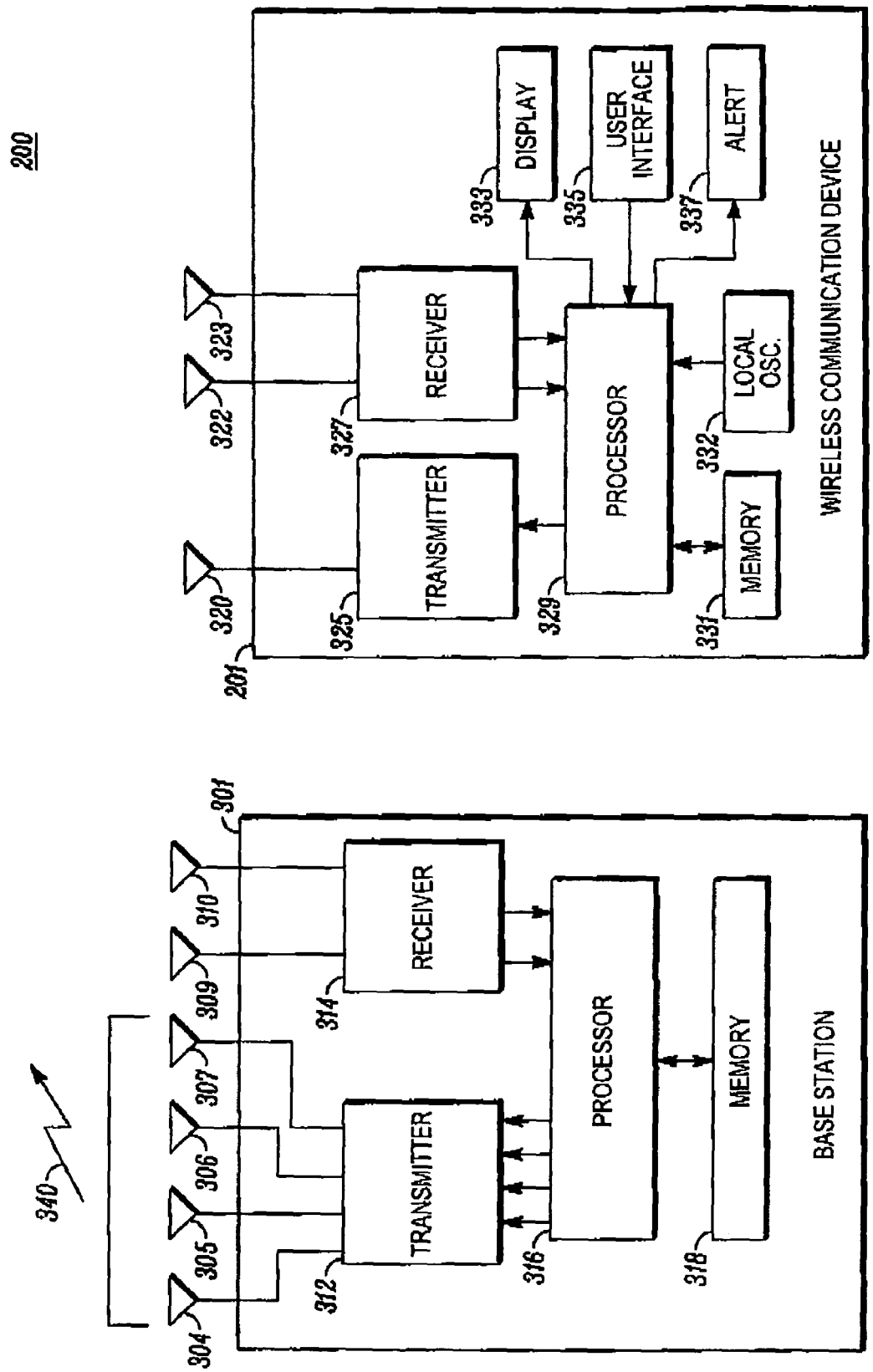
FIG. 3 illustrates electrical block diagrams of an exemplary base station usable in the wireless communication system of FIG. 2 and a wireless communication device, in accordance with an exemplary embodiment of the present invention.

FIG. 3 illustrates electrical block diagrams of the wireless communication device 201 and an exemplary base station 301 usable in the wireless communication system 200 of FIG. 2. The base station 301 may be used to implement any of the base stations 203-205 of the wireless communication system 200 of FIG. 2. Each base station 301 includes, inter alia, one or more transmit antennas 304-307 (four shown for illustrative purposes), one or more receive antennas 309, 310 (two shown for illustrative purposes), one or more transmitters 312 (one shown for illustrative purposes), one or more receivers 314 (one shown for illustrative purposes), one or more processors 316 (one shown for illustrative purposes), and memory 318. Although illustrated separately, the transmitter 312 and the receiver 314 may be integrated into one or more transceivers as is well understood in the art. By including multiple transmit antennas 304-307 and other appropriate hardware and software as would be understood by those of ordinary skill in the art, the base station 301 may support use of a multiple input and multiple output (MIMO) antenna system for downlink (base station-to-wireless communication device) communications. The MIMO system facilitates simultaneous transmission of downlink data streams from multiple transmit antennas 304-307 depending upon a channel rank, for example as indicated by the wireless communication device 201 or as preferred by the base station 301. A rank supplied by the wireless communication device 201 assists or enables the base station 301 to determine an appropriate multiple antenna configuration (e.g., transmit diversity, open loop spatial multiplexing, closed loop spatial multiplexing, etc.) for a downlink transmission in view of the current downlink channel conditions.

The processor 316, which is operably coupled to the transmitter 312, the receiver 314, and the memory 318, can be one or more of a microprocessor, a microcontroller, a digital signal processor (DSP), a state machine, logic circuitry, any combination thereof, or any other device or combination of devices that processes information based on operational or programming instructions stored in the memory 318. One of ordinary skill in the art will appreciate that the processor 316 can be implemented using multiple processing devices as may be required to handle the processing requirements of the present invention and the various other functions of the base station 301. One of ordinary skill in the art will further recognize that when the processor 316 has one or more of its functions performed by a state machine or logic circuitry, the memory containing the corresponding operational instructions can be embedded within the state machine or logic circuitry as opposed to being external to the processor 316.

The memory 318, which may be a separate element as depicted in FIG. 3 or may be integrated into the processor 316, can include random access memory (RAM), read-only memory (ROM), FLASH memory, electrically erasable programmable read-only memory (EEPROM), removable memory, a hard disk, and/or various other forms of memory as are well known in the art. The memory 318 can include various components, such as, for example, one or more program memory components for storing programming instructions executable by the processor 316, one or more address memory components for storing an identifier associated with the base station 301 as well as for storing addresses for wireless communication devices currently in communication with the base station 301, and various data storage components. The identifier associated with the base station 301 may be derived from at least one of an offset identifier specific to the base station, a base station identifier, a cell site identifier, a physical cell identifier, a global cell identifier, a slot index, a subframe index, a system frame number, and/or a radio network transaction identifier. The program memory component of the memory 318 may include a protocol stack for controlling the transfer of information generated by the processor 316 over the data and/or control channels of the system 200. It will be appreciated by one of ordinary skill in the art that the various memory components can each be a group of separately located memory areas in the overall or aggregate memory 318 and that the memory 318 may include one or more individual memory elements.

In one embodiment, the base station transmitter 312, receiver 314, and processor 316 are designed to implement and support a wideband wireless protocol, such as the Universal Mobile Telecommunications System (UMTS) protocol, the E-UTRA protocol, the 3GPP Long Term Evolution (LTE) protocol, or a proprietary protocol, operating to communicate digital information, such as user data (which may include voice, text, video, and/or graphical data) and/or control information, between the base station 301 and the wireless communication device 201 over various types of channels. In an E-UTRA system, an uplink data channel may be a PUSCH, an uplink control channel may be a physical uplink control channel (PUCCH), a downlink control channel may be a physical downlink control channel (PDCCH), and downlink data channel may be a physical downlink shared channel (PDSCH). Uplink control information may be communicated over the PUCCH and/or the PUSCH and downlink control information is communicated typically over the PDCCH.

When the base station 301 implements the E-UTRA standard, the base station processor 316, in one embodiment, includes a logical channel coding and multiplexing section for implementing channel coding and multiplexing of control information, a positioning reference signal, and data destined for transmission over a downlink subframe 340. Several types of downlink channels may be combined into a single downlink subframe 340 as described in more detail below with respect to FIGS. 5-7. The channel coding and multiplexing section is a logical section of the base station processor 316, which performs the coding and multiplexing responsive to programming instructions stored in memory 318. The channel coding and multiplexing section may include one channel coding block for encoding control channel information (e.g., channel quality indicators, cell-specific reference symbols (CRS), rank indicators, and hybrid automatic repeat request acknowledgments (HARQ-ACK/NACK) into associated transmission resources (e.g., time-frequency resource elements), another block for encoding the positioning reference signal and other information typically communicated over the primary/secondary synchronization channel (e.g., P/S-SCH) into associated transmission resources, and a further channel coding block for encoding data into data channel (e.g., PUSCH) transmission resources. The channel coding and multiplexing section of the processor 316 may include additional coding blocks for encoding various other types of information and/or reference symbols used by the wireless communication device 201 for demodulation and downlink channel quality determination. The channel coding and multiplexing section of the processor 316 also includes a channel multiplexing block that multiplexes the encoded information generated by the various channel coding blocks into a subframe, which is supplied to the transmitter 312 for downlink transmission.

Each wireless communication device 201 includes, inter alia, one or more transmit antennas 320 (one shown for illustrative purposes), one or more receive antennas 322, 323 (two shown for illustrative purposes), one or more transmitters 325 (one shown for illustrative purposes), one or more receivers 327 (one shown for illustrative purposes), a processor 329, memory 331, a local oscillator 332, an optional display 333, an optional user interface 335, and an optional alerting mechanism 337. Although illustrated separately, the transmitter 325 and the receiver 327 may be integrated into one or more transceivers as is well understood in the art. By including multiple receive antennas 322, 323 and other appropriate hardware and software as would be understood by those of ordinary skill in the art, the wireless communication device 201 may facilitate use of a MIMO antenna system for downlink communications.

The wireless communication device transmitter 325, receiver 327, and processor 329 are designed to implement and support a wideband wireless protocol, such as the UMTS protocol, the E-UTRA protocol, the 3GPP LTE protocol or a proprietary protocol, operating to communicate digital information, such as user data (which may include voice, text, video, and/or graphical data) and/or control information, between the wireless communication device 201 and a serving base station 301 over control and data channels. In an E-UTRA system, an uplink data channel may be a PUSCH and an uplink control channel may be a PUCCH. Control information may be communicated over the PUSCH and/or the PUCCH. Data is generally communicated over the PUSCH.

The processor 329 is operably coupled to the transmitter 325, the receiver 327, the memory 331, the local oscillator 332, the optional display 333, the optional user interface 335, and the optional alerting mechanism 337. The processor 329 utilizes conventional signal-processing techniques for processing communication signals received by the receiver 327 and for processing data and control information for transmission via the transmitter 325. The processor 329 receives its local timing and clock from the local oscillator 332, which may be a phase locked loop oscillator, frequency synthesizer, a delay locked loop, or other high precision oscillator. The processor 329 can be one or more of a microprocessor, a microcontroller, a DSP, a state machine, logic circuitry, or any other device or combination of devices that processes information based on operational or programming instructions stored in the memory 331. One of ordinary skill in the art will appreciate that the processor 329 can be implemented using multiple processors as may be required to handle the processing requirements of the present invention and the various other included functions of the wireless communication device 201. One of ordinary skill in the art will further recognize that when the processor 329 has one or more of its functions performed by a state machine or logic circuitry, the memory containing the corresponding operational instructions can be embedded within the state machine or logic circuitry as opposed to being external to the processor 329.

The memory 331, which may be a separate element as depicted in FIG. 3 or may be integrated into the processor 329, can include RAM, ROM, FLASH memory, EEPROM, removable memory (e.g., a subscriber identity module (SIM) card or any other form of removable memory), and/or various other forms of memory as are well known in the art. The memory 331 can include various components, such as, for example, one or more program memory components for storing programming instructions executable by the processor 329 and one or more address memory components for storing addresses and/or other identifiers associated with the wireless communication device 201 and/or the base stations 203-205. The program memory component of the memory 331 may include a protocol stack for controlling the transfer of information generated by the processor 329 over the data and/or control channels of the system 200, as well as for controlling the receipt of data, control, and other information transmitted by the base stations 203-205. It will be appreciated by one of ordinary skill in the art that the various memory components can each be a group of separately located memory areas in the overall or aggregate memory 331 and that the memory 331 may include one or more individual memory elements.

The display 333, the user interface 335, and the alerting mechanism 337 are all well-known elements of wireless communication devices. For example, the display 333 may be a liquid crystal display (LCD) or a light emitting diode (LED) display and associated driver circuitry, or utilize any other known or future-developed display technology. The user interface 335 may be a key pad, a keyboard, a touch pad, a touch screen, or any combination thereof, or may be voice-activated or utilize any other known or future-developed user interface technology. The alerting mechanism 337 may include an audio speaker or transducer, a tactile alert, and/or one or more LEDs or other visual alerting components, and associated driver circuitry, to alert a user of the wireless communication device 302. The display 333, the user interface 335, and the alerting mechanism 337 operate under the control of the processor 329.

Referring now to FIGS. 2-7, operation of a base station 301 (which may be any of the base stations 203-205 in the exemplary wireless system 200) occurs substantially as follows in accordance with the present invention. At a predetermined time (e.g., periodically or aperiodically), the base station processor 316 optionally encodes (401) control information into a first set of transmission resources of a reference block of transmission resources allocated for transmission. Where the base station 301 implements the E-UTRA or LTE standard, the allocated block of transmission resources includes time-frequency resource elements to be multiplexed into a subframe of OFDM symbols forming one or more transmission channels. For each transmit antenna, the set of transmission resources form a two-dimensional resource element grid in time and frequency. In frequency, the transmission resources are typically mapped into different subcarriers within each OFDM symbol across the transmission bandwidth. Multiple such OFDM symbols comprise a subframe. In the E-UTRA standard, at least two subframe structures one with 14 OFDM symbols referred to as a "normal CP subframe" and one with 12 OFDM symbols referred to an "extended CP subframe" are defined. The subframe may be further divided into two halves or slots with an equal number of OFDM symbols in each slot. A subframe may carry one or more transmission channels, such as a control channel (e.g., PDCCH, PCFICH, PHICH), data channel (e.g., PDSCH), broadcast channel (e.g., PBCH), synchronization channel (e.g., P/S-SCH), or any other channel. In addition to these channels, the subframe may include a cell-specific reference signal, a dedicated or UE-specific reference signal, a positioning reference signal, or any other reference signal.

In E-UTRA, there are two types of subframes—a unicast subframe where the cell-specific reference symbols are sent in both slots of the subframe, special sub-frames or non-unicast subframes. For example, Multimedia Broadcast Multicast Service over a Single Frequency Network (MBSFN) subframe have a subframe structure that is different from the structure of a unicast subframe. In the special subframes or non-unicast subframes, the first one or two (or possibly zero) OFDM symbols may contain the PDCCH and reference symbols, whereas the rest of the subframe (including the reference symbol (RS) structure) may be different than a unicast subframe. For instance, the MBSFN subframe is a type of non-unicast subframe wherein the rest of the subframe may be blanked or empty and these empty resources can be used to transmit positioning reference symbols. The non-unicast (or special subframe) signaling pattern may be part of a system configuration or System Information Broadcast or Block (SIB) message and may be defined on a radio frame level (10 subframes) or for a group of radio frames. In one embodiment, the base station processor 316 encodes control information into resource elements to be multiplexed into a portion of the first two OFDM symbols of the subframe.

The coded control information may include downlink assignments or uplink grants, control channel duration, and hybrid automatic repeat request acknowledgments (HARQ-ACK/NACK). In addition to the control information, a set of symbols corresponding to a cell-specific reference signal may be included in the subframe. The cell-specific reference signal may be used for channel estimation, demodulation, delay tracking, mobility-related measurements, and other purposes by the wireless device 201. When included, the sequence of symbols corresponding to the cell specific reference signal and the time-frequency locations occupied by the symbols may be derived from an identifier associated with the base station 301. Such identifier may include a physical cell identifier (PCID), a slot index and/or a symbol index, all of which are well known in the art particularly in connection with the E-UTRA standard. In addition, the subcarrier offset used for mapping the symbols of the cell-specific reference signal into an OFDM symbol may be derived from the physical cell identifier.

In addition to optionally encoding control information and the cell-specific reference signal into transmission resources, the base station processor 316 encodes (403) a positioning reference signal into a second set of transmission resources. The base station processor 316 encodes the positioning reference signal into a portion of a plurality of resource blocks where each resource block comprises a two-dimensional grid of approximately 12 contiguous subcarriers in frequency and all the OFDM symbols of the subframe in time where each OFDM symbol is associated with a normal or an extended cyclic prefix as described in the E-UTRA standard. For illustration purposes, a typical resource block is defined as the resources available in 12 subcarriers and all OFDM symbols of the subframe. It should be noted that the resource block dimensions may vary because as some of the subcarriers of OFDM symbols may be used for other purposes, such as transmission of a pre-determined control primary broadcast channel, synchronization channels, etc. The number of resource blocks available for transmission on the downlink (i.e., the link between the base station 301 and wireless device 201) may be dependent on the transmission bandwidth. The base station processor 316 may be programmed to encode the positioning reference signal into a subset of the available OFDM symbols in the subframe. In one exemplary embodiment, the base station processor 316 encodes the positioning reference signal into a portion of 600 resource elements of an OFDM symbol of the subframe when the downlink transmission bandwidth is 10 MHz. Further, not all of the subcarriers on these OFDM symbols may be used for carrying the transmission resources corresponding to the positioning reference signal. In one example, every sixth subcarrier is used for transmitting the symbols of the positioning reference signal. In such an exemplary embodiment, the single OFDM symbol carrying the positioning reference signal may have a cyclic prefix greater than the cyclic prefixes associated with other OFDM symbols in the non-control channel portion of the subframe. For example, the cyclic prefix associated with the single OFDM symbol carrying the positioning reference signal may be greater than 16.67 microseconds (which is the extended cyclic prefix provided under the E-UTRA standard) and, in one embodiment, is 25 microseconds. Of course, those of ordinary skill in the art will readily recognize and appreciate that the positioning reference signal may be encoded into various other quantities of transmission resources and still remain within the scope of the present invention.

In one embodiment, the transmission resources carrying the control information (e.g., control channel or PDCCH) and the positioning reference signal constitute less than all the transmission resources available for transmission. As a result, the base station processor 316 may optionally encode (405) data into a third set of transmission resources to utilize a portion of the subframe for transmission.

The base station processor 316 may optionally encode the control information coded into the first set of transmission resources and, in one embodiment, may encode the positioning reference signal, and any optional data into their respective sets of transmission resources. The base station processor 316 may multiplex (407) the transmission resources containing the control information into OFDM symbols in a control channel portion (e.g., PDCCH over the first two OFDM symbols) of a subframe. Additionally, the base station processor 316 multiplexes (409) the transmission resources containing the positioning reference signal into OFDM symbols in a part or a portion of a non-control channel portion of the subframe.

In other words, in contrast to the subframe structure illustrated in FIG. 1 as proposed in Contribution No. R1-090353 to the 3GPP Radio Access Network (RAN) Working Group 1 (3GPP RAN1), in which the positioning reference signal (PRS) is multiplexed into two resource elements of each OFDM symbol in the non-control channel portion of a subframe within a resource block, the base station processor 316 multiplexes the positioning reference signal resources into only part of the non-control channel portion of the subframe leaving at least one of the OFDM symbols in the non-control channel portion of the subframe either empty or available for other information, such as a data transmission. In one embodiment, the base station processor 316 optionally multiplexes (411) one or more empty or blank OFDM symbols into the non-control portion of the subframe so as to be temporally adjacent an OFDM symbol carrying positioning reference signal transmission resources. For example, the base station processor 316 may multiplex multiple empty OFDM symbols into the non-control portion of the subframe such that at least one empty OFDM symbol is positioned immediately preceding the OFDM symbol carrying the positioning reference signal transmission resources and such that at least one empty OFDM symbol is positioned immediately succeeding the OFDM symbol carrying the positioning reference signal transmission resources. Such an exemplary embodiment effectively provides guard periods around the OFDM symbol carrying the positioning reference signal transmission resources when a cyclic prefix of such OFDM symbol is normal or extended as provided in the E-UTRA standard so as to mitigate the effects of downlink channel delay spread when such delay spread exceeds the cyclic prefix of the OFDM symbol. The use of empty or blank OFDM symbols adjacent an OFDM symbol carrying positioning reference signal transmission resources further helps to insure orthogonality between subframe transmissions from base stations serving neighboring service coverage areas (e.g., cells or sectors) as described in more detail below with respect to FIG. 5.

Figure 5:
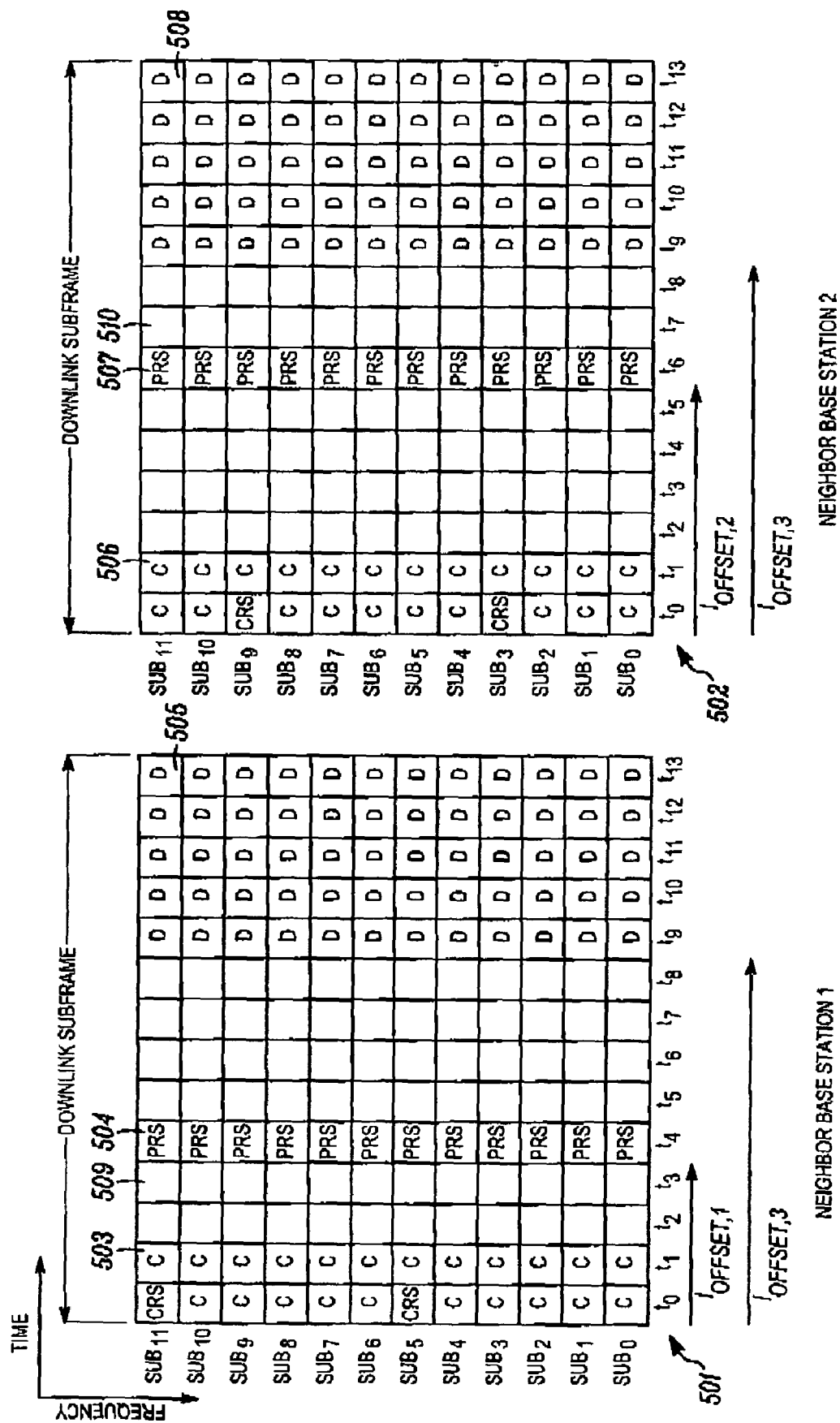
FIG. 5 illustrates exemplary downlink subframes for communicating positioning reference signals to a wireless communication device from neighbor cell base stations, in accordance with a first exemplary embodiment of the present invention.
Figure 6:
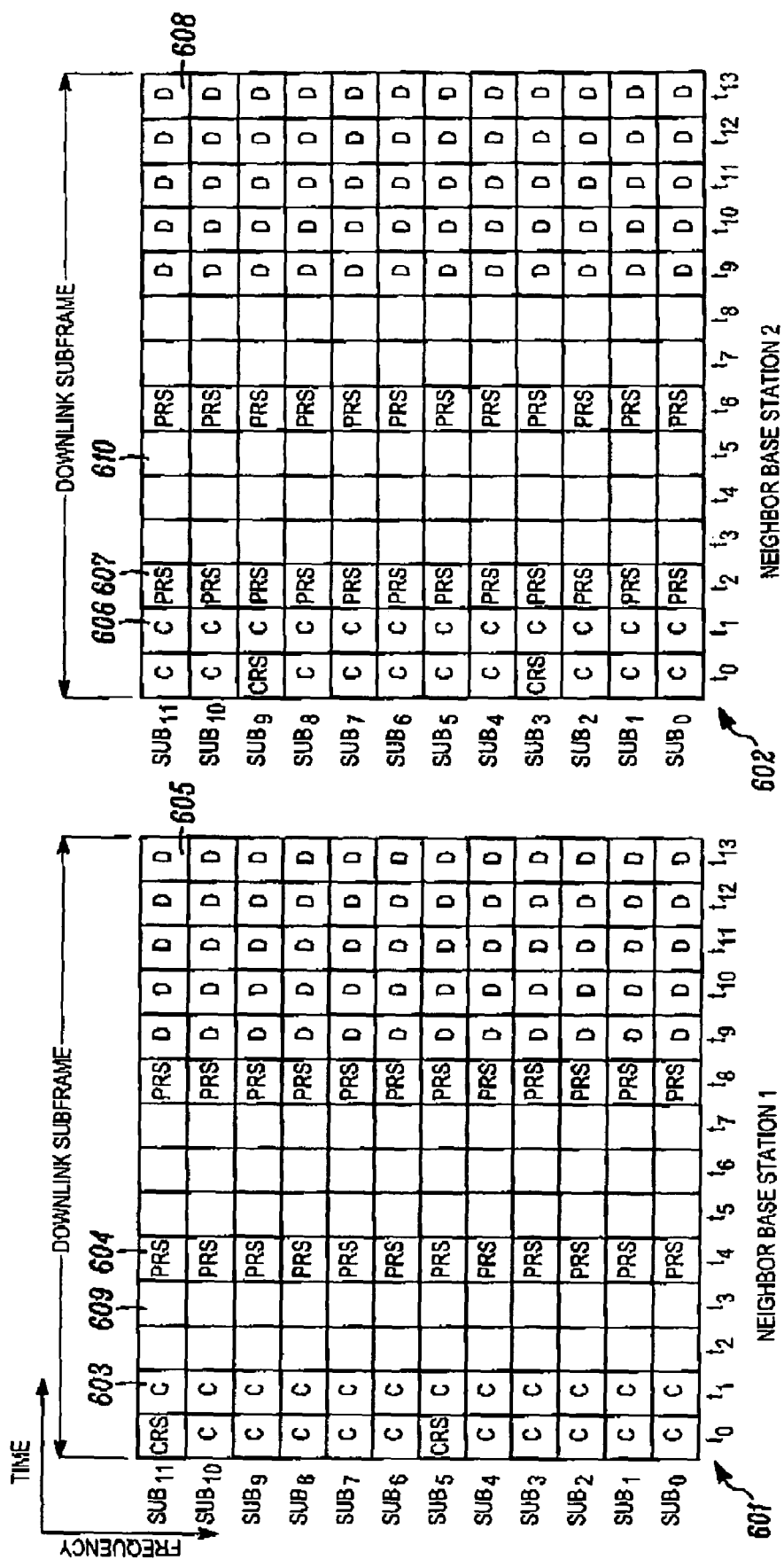
FIG. 6 illustrates exemplary downlink subframes for communicating positioning reference signals to a wireless communication device from neighbor cell base stations, in accordance with a second exemplary embodiment of the present invention.
Figure 7:
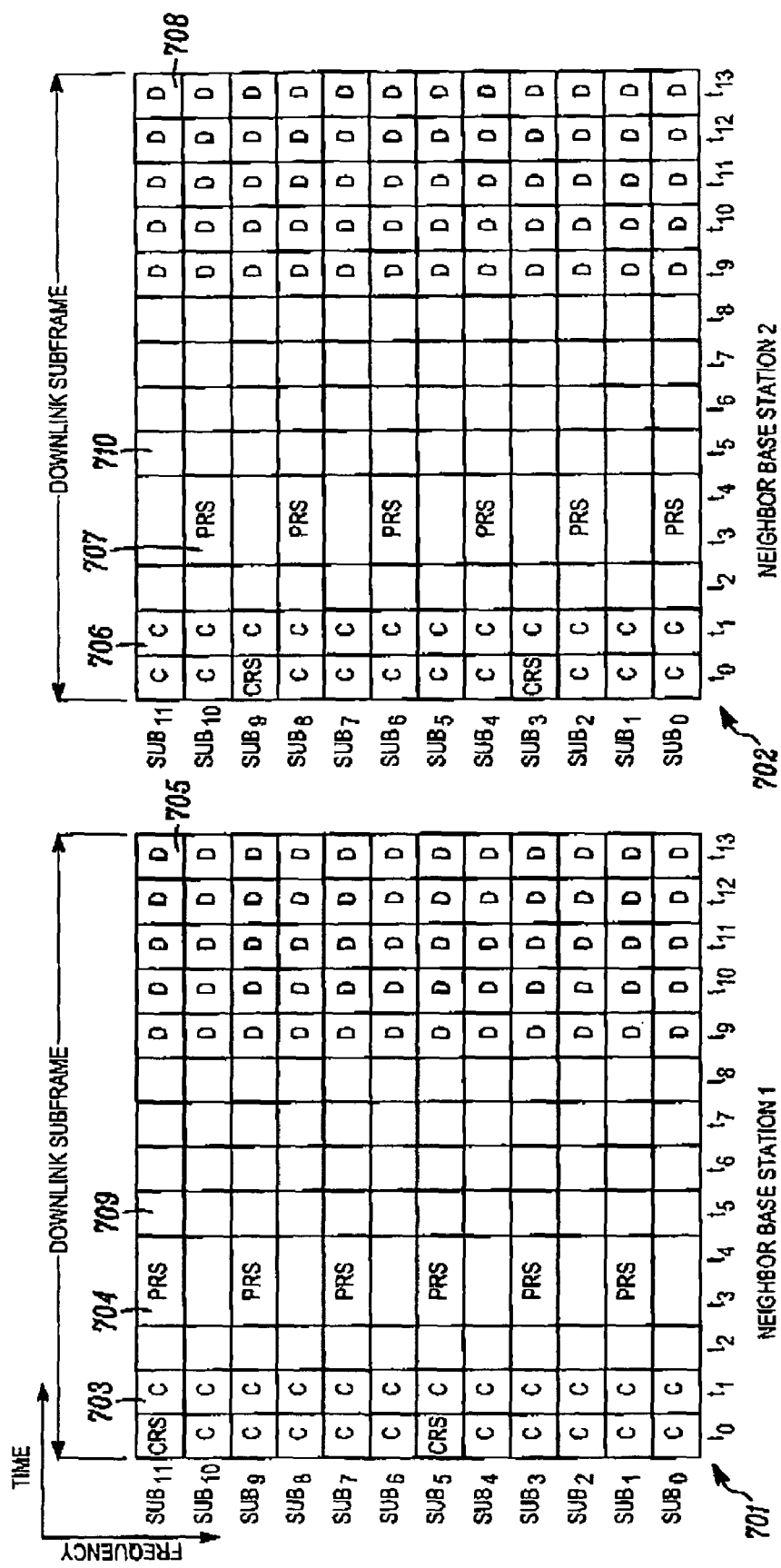
FIG. 7 illustrates exemplary downlink subframes for communicating positioning reference signals to a wireless communication device from neighbor cell base stations, in accordance with a third exemplary embodiment of the present invention.
Figure 8:
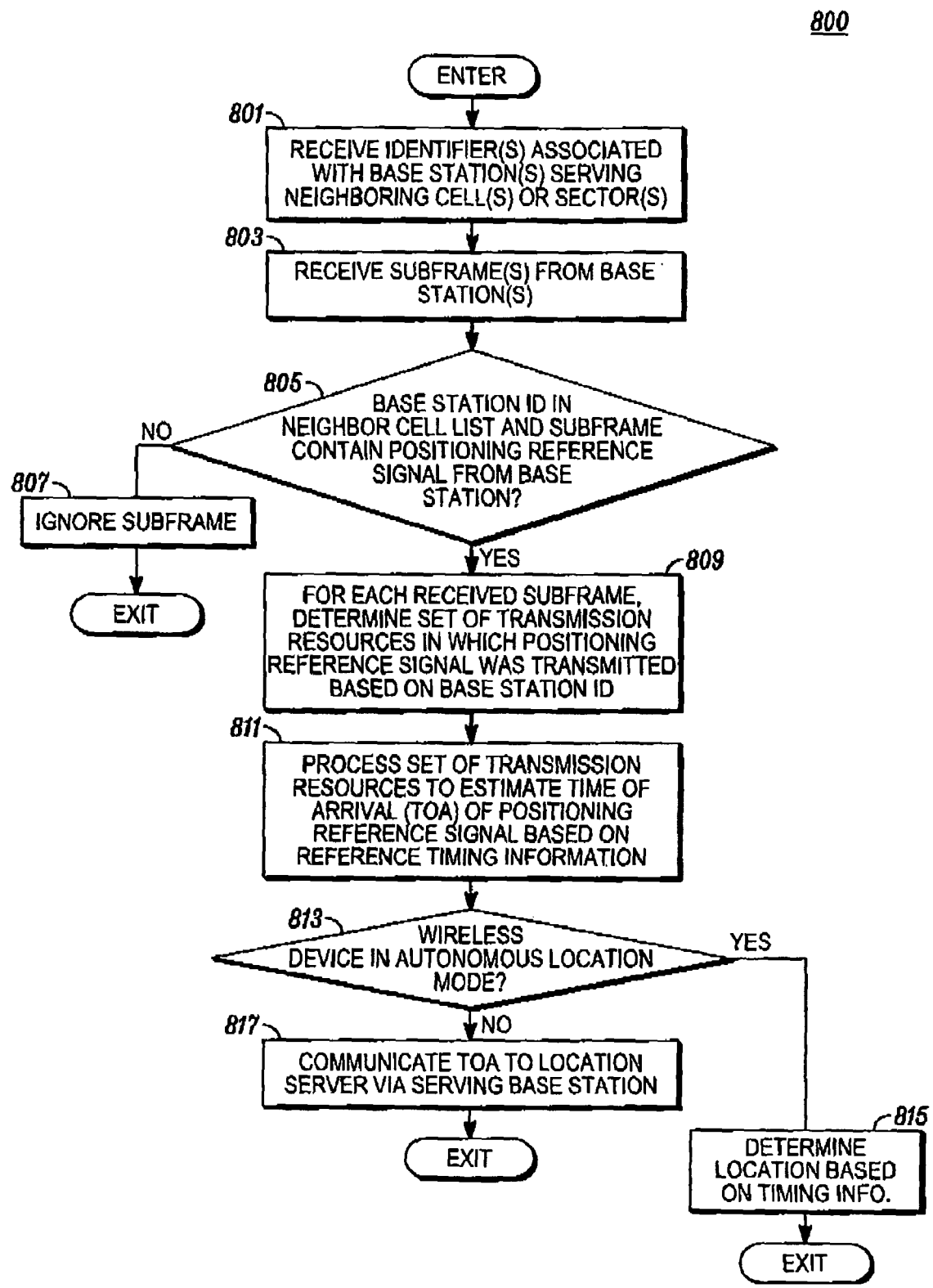
FIG. 8 is a logic flow diagram of steps executed by a wireless communication device to process a downlink subframe containing a positioning reference signal, in accordance with an exemplary embodiment of the present invention.

In addition to optionally multiplexing the control information transmission resources, the cell-specific reference signal and the positioning reference signal transmission resources into OFDM symbols of the subframe, the base station processor 316 multiplexes (413) all optionally-included data transmission resources into remaining OFDM symbols in the non-control portion of the subframe (i.e., into a data channel, such as a PDSCH) when the processor 316 is programmed to include such data in the subframe. In one embodiment, the data resources are multiplexed into a subset of OFDM resources in the non-control portion of the subframe that are mutually exclusive of the OFDM symbols carrying the positioning reference signal resources. For example, the data resources may be multiplexed into a set of one or more OFDM symbols that is separated in time by at least one OFDM symbol from the OFDM symbol or symbols carrying the positioning reference signal resources. Alternatively, the data resources may be multiplexed into a set of OFDM symbols that are temporally adjacent the OFDM symbol or symbols carrying the positioning reference signal resources. Exemplary subframes containing coded positioning reference signals multiplexed into OFDM symbols as produced by base station processors 316 implementing embodiments of the present invention are illustrated in FIGS. 5-7. After the entire block of transmission resources have been multiplexed into the subframe, the base station transmitter transmits (415) the subframe via one or more of the antennas 304-307.

Figure 4:
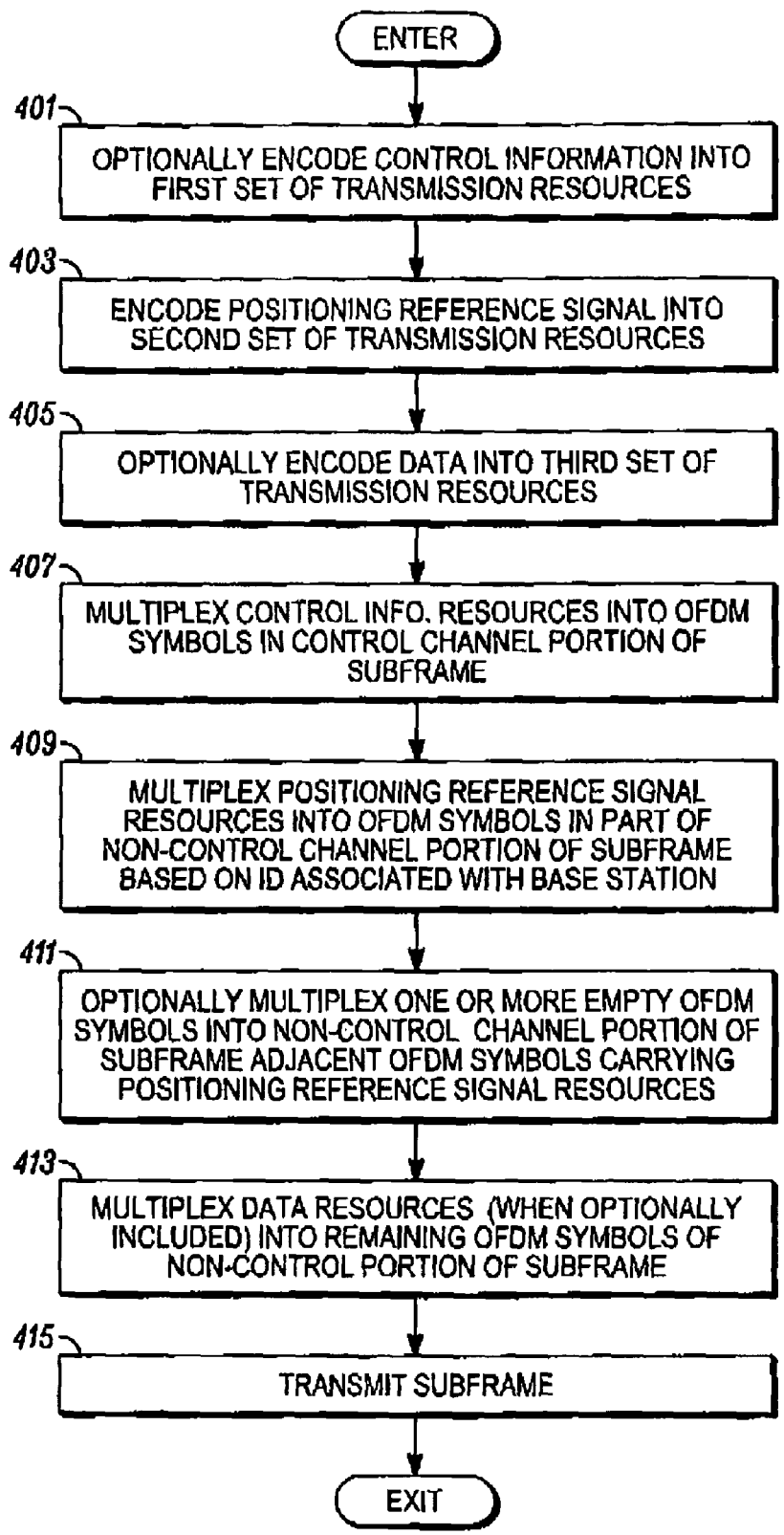
FIG. 4 is a logic flow diagram of steps executed by a base station to generate a downlink subframe for transmission of a positioning reference signal to a wireless communication device, in accordance with an exemplary embodiment of the present invention.

Although the encoding of the control information, the positioning reference signal, and any optional data have been shown in one exemplary order in FIG. 4, those of ordinary skill in the art will readily recognize and appreciate that the coding order may be changed as so desired and is not critical to the present invention. Similarly, although the multiplexing of the control information resources, the positioning reference signal resources, and the data resources (when included) have been shown in one exemplary order in FIG. 4, those of ordinary skill in the art will readily recognize and appreciate that the multiplexing order may be changed as so desired and is not critical to the present invention.

FIGS. 5-7 illustrate exemplary downlink subframes 501-502, 601-602, 701-702 in an E-UTRA or LTE system for communicating thepositioning reference signal to wireless communication devices 201, in accordance with exemplary embodiments of the present invention. In the exemplary subframes 501-502, 601-602, 701-702, "C" represents channel-coded control information symbols, "CRS" represents cell-specific reference signal symbols, "PRS" represents positioning reference signal symbols, and "D" represents channel-coded data symbols.

Referring first to FIG. 5, such figure depicts subframes 501, 502 generated and transmitted by base stations providing communication service to service coverage areas (e.g., cells or cell sectors) adjacent to or neighboring the service coverage area in which the wireless communication device 201 receiving the subframes is located. For example, in the wireless system 200 illustrated in FIG. 2, if base station 204 is supplying communication service to the wireless device 201 (i.e., the wireless device 201 is located in the service coverage area of base station 204 and, therefore, base station 204 is the serving station for the wireless device 201), then the service coverage areas serviced by base stations 203 and 205 may be considered neighboring service coverage areas and base stations 203 and 205 may be considered neighboring base stations. One of ordinary skill in the art will readily appreciate and recognize that the quantity of neighboring service coverage areas and base stations may exceed the two illustrated in FIG. 2. Accordingly, the approach disclosed herein for subframe creation may be used by every base station in the applicable wireless system because, at some point in time, each base station serves a service coverage area neighboring a service coverage area in which at least one wireless communication device is located.

According to the present invention, the base station processors 316 generate their subframes 501, 502 so as to achieve and maintain orthogonality of their positioning reference signals in the presence of various downlink channel conditions. In the subframe structure embodiments illustrated in FIG. 5, the base station processors 316 are programmed to map or multiplex resource elements 503, 506 containing control information bits into the first two OFDM symbols of the subframe 501, 502 (e.g., the OFDM symbols corresponding to time segments $t_0$ and $t_1$ of each subframe 501, 502). Such OFDM symbols may be considered to form the control channel (e.g., PDCCH) portion or the control region of the subframe 501, 502. The base station processors 316 are further programmed to multiplex resource elements 504, 507 containing the positioning reference signal and resource elements 505, 508 containing channel-coded data bits (when included) into the remaining OFDM symbols of the subframe, which constitute the non-control channel portion of the subframe 501, 502. Thus, the resource elements 504, 507 containing the positioning reference signal are multiplexed into less than all the OFDM symbols in the non-control channel portion of the subframe 501, 502. In the absence of data, the resource elements 505, 508 allocated for data payload may be empty or blank. When data is included, the non-control channel portion of the subframe is effectively divided into two or more subsets, one subset containing the OFDM symbols carrying the positioning reference signal and the other subset(s) containing empty OFDM symbols, data, and/or other information.

When a positioning reference signal is to be included, the resource elements for carrying the positioning reference signal may be allocated in either a pre-determined fashion (e.g., as defined in the E-UTRA or LTE standards), semi-statically through broadcast (e.g. via signaling in a master information block (MIB) or system information block (SIB)) or in a user-specific message (e.g., radio resource control measurement configuration message), dynamically (e.g., via control channel signaling in PDCCH), or by higher layer signaling (e.g., location server protocol data units). In the exemplary subframes 501, 502 of FIG. 5, the duration of and cyclic prefix associated with each OFDM symbol of the subframe is identical. In alternative embodiments, such as the embodiment disclosed below with respect to FIG. 7, the OFDM symbols carrying the positioning reference signal may have a longer duration and be associated with a greater cyclic prefix than the other OFDM symbols in at least the non-control channel portion of the subframe 501, 502. In the exemplary subframes 501, 502 of FIG. 5, the control region of the subframe comprises two OFDM symbols. In alternative embodiments, the control region may comprise one OFDM symbol or three OFDM symbols. In the exemplary subframes 501, 502 of FIG. 5, the last five OFDM symbols may optionally contain a data transmission. In alternative embodiments either no OFDM symbol may be allocated for data transmission or a different number of OFDM symbols may be allocated for data transmission. The portion of the non-control region that may contain data transmission may be pre-determined (e.g., specified in a 3GPP specification) or indicated to the UE semi-statically in a broadcast message (e.g. master information block or system information block) or through higher layer signaling.

In the embodiment illustrated in FIG. 5, the resource elements 504, 507 containing the respective positioning reference signals are mapped or multiplexed onto different OFDM symbols, thereby achieving orthogonality. For example, the resource elements 504 containing the positioning reference signal transmitted by a first neighbor base station (e.g., base station 203) may be multiplexed into the fifth OFDM symbol at time segment $t_4$ of subframe 501. By contrast, the resource elements 507 containing the positioning reference signal transmitted by a second neighbor base station (e.g., base station 205) may be multiplexed into the seventh OFDM symbol at time segment $t_6$ of subframe 502. The subframes 501, 502 may be contemporaneous or offset in time. In one embodiment, the mapping of which OFDM symbol of the subframe 501, 502 contains the positioning reference signal is based on an identifier associated with the base station 203, 205, which may take into account the base station's location in the system 200 and the reuse pattern of the various subcarriers used to generate OFDM symbols of the subframe. The identifier may be one or more of an offset identifier, a base station identifier, a cell site identifier, a physical cell identifier (PCID), a global cell identifier (GCID), a symbol index, a slot index, a subframe index, a system frame number (SFN), and/or a radio network transaction identifier (RNTI). In the exemplary subframes 501, 502 of FIG. 5, the resource elements 505, 507 containing data bits, when included, are multiplexed into the last five OFDM symbols of the subframe 501, 502, thereby forming a data channel (e.g., PDSCH) portion of the subframe 501, 502.

To further increase the likelihood that orthogonality of the positioning reference signal is maintained under all downlink channel conditions, the OFDM symbols which two neighboring base stations are allowed to use to communicate positioning reference signal resource elements 504, 507 are separated by at least one OFDM symbol such that $|l_{offset,2} - l_{offset,1}| \geq 2$, where $l_{offset,1}$ is the symbol position in subframe 501 of the OFDM symbol carrying the positioning reference signal resource elements 504 transmitted by one neighbor base station (e.g., base station 203) and $l_{offset,2}$ is the symbol position in subframe 502 of the OFDM symbol carrying the positioning reference signal resource elements 507 transmitted by the other neighbor base station (e.g., base station 205). Separation of the two OFDM symbols carrying the positioning reference signal resource elements 504, 507 by at least one ODFM symbol is preferable to preserve orthogonality between transmissions from different base stations (e.g., serving two different sectors or two neighboring cells) when the sum of the propagation delay between the base station transmitters 312 and the multipath delay spread of the propagation channel exceeds the cyclic prefix length associated with the OFDM symbols carrying the positioning reference signal resource elements 504, 507. In a synchronous network, such orthogonality can be achieved in an uncoordinated fashion by, for example, setting the OFDM symbol position offset as a function of an identifier associated with the base station 203, 205 that is transmitting the subframe 501, 502. For example, the symbol position of the OFDM symbol carrying the positioning reference signal resource elements 504, 507 may be determined as $l_{offset,ID} = f(ID) = \text{mod}(2 \text{ ID} + 2, 12)$, where the identifier associated with the base station transmitting the subframe 501, 503 (ID) may be derived from one or more of a physical cell identifier (PCID), a base station identifier, a cell site ID, a global cell identifier (GCID), a system frame number (SFN), a symbol index, a slot index, a subframe index, a radio network transaction identifier (RNTI) or any other applicable identifier. In this example, two consecutive identifiers (e.g., ID and ID+1) are associated with two neighboring base stations in a synchronous deployment, which results in a gap between transmissions of the positioning reference signal from the two transmitters ensuring orthogonality. The function $f(\cdot)$ can be a generic function (e.g., a pre-determined mapping specified in a 3GPP specification or a pseudo-random mapping) or a mapping that orthogonalizes positioning reference signal transmissions from two base stations with different identifiers.

The positioning reference signals (e.g., observed time difference of arrival (OTDOA) waveforms) from neighboring base stations 203, 205 can be used jointly such that there is time-domain separation between transmissions of such signals from neighboring base stations 203, 205. Further, not all of the subcarriers or resource elements on the OFDM symbols carrying the positioning reference signal may be used for transmission. The set of resource elements carrying the positioning reference signal in an OFDM symbol may determined as a function of an identifier associated with the transmitting base station which may be derived from at least one of a physical cell identifier (PCID), a base station identifier, a cell site ID, a global cell identifier (GCID), a system frame number (SFN), a symbol index, a slot index, a subframe index, a radio network transaction identifier (RNTI) or any other applicable identifier. In one embodiment, P/S-SCH extension techniques can be used to multiplex resource elements across a bandwidth of the subframes 501, 502 for the OFDM symbols used by the base stations 203, 205 to communicate the positioning reference signals.

To enhance the timing extraction support from the positioning reference signal, the sequence of symbols used for encoding the transmission resources corresponding to the positioning reference signal may be generated in a way to avoid secondary cross-correlation peaks. A Gold sequence generator may be used for generating an in-phase (I) stream and a quadrature (Q) stream, and a QPSK sequence may be constructed from the I-Q streams. The initializers or the seeds for the registers in the Gold sequence generator may be derived from an identifier associated with the base station. The identifier may be derived from at least one of a physical cell identifier (PCID), a base station identifier, a cell site ID, a global cell identifier (GCID), a system frame number (SFN), a symbol index, a slot index, a subframe index, a radio network transaction identifier (RNTI) or any other applicable identifier. Further, such an identifier may be used to derive an offset that is used as the starting point of extraction of a subsequence from the so-derived QPSK sequence. This QPSK sequence may then be used for encoding the transmission resources used for transmitting the positioning reference signal. In another example, an orthogonal set of time-frequency resources for transmission of positioning reference symbols (PRS) may be identified for use in a set of coordinating base stations. Thus, coordinating base stations can orthogonalize their PRS transmissions by selecting different indices into the orthogonal set of time-frequency resources and this index may also be considered as part of the identifier.

In one embodiment, to further aid in preserving orthogonality when OFDM symbols carrying positioning reference signal resource elements 504, 507 are transmitted by neighboring base stations 203, 205 and are separated by at least one ODFM symbol, blank or empty resource elements 509, 510 are multiplexed into one or more of the OFDM symbols immediately adjacent the OFDM symbols carrying the positioning reference signal resource elements 504, 507. For example, as illustrated in subframe 501, blank resource elements 509 are multiplexed into the fourth and sixth OFDM symbols adjacent to the fifth OFDM symbol, which is carrying the positioning reference signal resource elements 504. Similarly, as illustrated in subframe 502, blank resource elements 510 are multiplexed into the sixth and eighth OFDM symbols adjacent to the seventh OFDM symbol, which is carrying the positioning reference signal resource elements 507. In a further embodiment, blank or empty resource elements 509, 510 may also be multiplexed into an OFDM symbol corresponding to the OFDM symbol carrying a positioning reference signal of a neighboring base station. For example, one base station 203 may multiplex empty resource elements 509 into the seventh OFDM symbol of the subframe 501 (e.g., corresponding to time segment or duration $t_6$) when a neighboring base station 205 has multiplexed positioning reference signal resource elements 507 into the seventh OFDM symbol of another subframe 502.

Referring now to FIG. 6, such figure depicts alternative exemplary subframes 601, 602 generated and transmitted by base stations providing communication service to service coverage areas adjacent to or neighboring the service coverage area in which the wireless communication device 201 receiving the subframes is located. Similar to the subframes 501, 502 of FIG. 5, each of the subframes 601, 602 of FIG. 6 includes a control channel portion in which are multiplexed resource elements 603, 606 containing control information (e.g., resource elements corresponding to a PDCCH, a physical control format indicator channel (PCFICH), and/or a physical HARQ indicator channel (PHICH)) and cell-specific reference symbols and a non-control channel portion in which are multiplexed resource elements 604-605, 607-608 containing a positioning reference signal, optional cell-specific reference signal and optional data. As with the subframes 501, 502 of FIG. 5, the OFDM symbols carrying the positioning reference signal resource elements 604, 607 occupy only a portion (i.e., less than all) of the non-control channel portion of the subframe 601, 602. However, in contrast to the subframes 501, 502 depicted in FIG. 5, which illustrate the multiplexing of positioning reference signal resource elements 504, 507 into a single OFDM symbol in the non-control channel portion of each subframe 501, 502, the subframes 601, 602 of FIG. 6 illustrate the multiplexing of positioning reference signal resource elements 604, 607 into two OFDM symbols of each subframe 601, 602 so as to maintain orthogonality of the OFDM symbols. Similar to the subframes 501, 502 of FIG. 5, the OFDM symbols carrying the positioning reference signal resource elements 604, 607 are multiplexed into different OFDM symbols of each subframe 601, 602. For example, as illustrated in FIG. 6, positioning reference signal resource elements 604 are multiplexed or mapped into the fifth and ninth OFDM symbols of subframe 601 for transmission from one of the neighboring base stations (e.g., base station 203) and positioning reference signal resource elements 607 are multiplexed or mapped into the third and seventh OFDM symbols of subframe 602 for transmission from another one of the neighboring base stations (e.g., base station 205). Thus, in this embodiment as in the embodiment of FIG. 5, the OFDM symbols carrying positioning reference signal resource elements 604, 607 are separated by at least one OFDM symbol.

Additionally, as in the subframes 501, 503 of FIG. 5, each OFDM symbol carrying positioning reference signal resource elements 604, 607 is neighbored by at least one OFDM symbol containing blank or empty resource elements 609, 610 to aid in maintaining orthogonality of the OFDM symbols carrying positioning reference signal resource elements 604, 607 when the sum of the propagation delay between the base station transmitters 312 and the multipath delay spread of the propagation channel exceeds the cyclic prefix length associated with the OFDM symbols carrying the positioning reference signal resource elements 604, 607. Further, in one embodiment, blank or empty resource elements 609, 610 may be multiplexed into an OFDM symbol corresponding to the OFDM symbol carrying a positioning reference signal of a neighboring base station. For example, one base station 203 may multiplex empty resource elements 609 into the third and seventh OFDM symbols of the subframe 601 (e.g., corresponding to time segments or durations $t_2$ and $t_6$) when a neighboring base station 205 has multiplexed positioning reference signal resource elements 607 into the third and seventh OFDM symbols of another subframe 602. When the base station processors 316 are programmed to add channel-coded data bits to the subframe 601, 602, the resource elements 605, 608 containing such data may be multiplexed into OFDM symbols that are not used for communicating control information or the positioning reference signal. For example, as illustrated in FIG. 6, data resource elements 605, 608 are multiplexed into the last five OFDM symbols (i.e., corresponding to time segments $t_9$ through $t_{13}$) of each subframe 601, 602. In alternative embodiments either no OFDM symbol may be allocated for data transmission or a different number of OFDM symbols may be allocated for data transmission. The portion of the non-control region that may contain data transmission may be pre-determined (e.g., specified in a 3GPP specification) or indicated to the wireless communication device 201 semi-statically in a broadcast message (e.g., master information block or system information block) or through higher layer signaling.

FIG. 7 illustrates further exemplary subframes 701, 702 generated and transmitted by base stations providing communication service to service coverage areas adjacent to or neighboring the service coverage area in which the wireless communication device 201 receiving the subframes is located. Similar to the subframes 501-502, 601-602 of FIGS. 5 and 6, each of the subframes 701, 702 of FIG. 7 includes a control channel portion in which are multiplexed resource elements 703, 706 optionally containing control information bits, a cell-specific reference signal and other control information, and a non-control channel portion in which are multiplexed resource elements 704-705, 707-708 containing a positioning reference signal, optional data, and other optional information (e.g., cell-specific reference signal, synchronization channel, physical broadcast channel, etc.).

Similar to the subframes 501, 502 of FIG. 5, the subframes 701, 702 illustrated in FIG. 7 include a single OFDM symbol into which has been multiplexed positioning reference signal resource elements 704, 707. In subframes 701 and 702, the positioning reference signal resource elements 704, 707 are multiplexed onto a subset of the subcarriers forming the OFDM symbols carrying them. For example, in the embodiment depicted in FIG. 7, the positioning reference signal resource elements 704 are multiplexed onto one-half of the subcarriers forming the OFDM symbol carrying the positioning reference signal. As illustrated in FIG. 7, the positioning reference signal resource elements 704 in subframe 701 are multiplexed onto the second, fourth, sixth, eighth, tenth, and twelfth subcarriers ($sub_1$, $sub_3$, $sub_5$, $sub_7$, $sub_9$, $sub_{11}$) of the OFDM symbol corresponding to a particular time segment (e.g., $t_3$); whereas, the positioning reference signal resource elements 707 in subframe 702 are multiplexed onto the first, third, fifth, seventh, ninth, and eleventh subcarriers ($sub_0$, $sub_2$, $sub_4$, $sub_6$, $sub_8$, $sub_{10}$) at the same time segment (e.g., $t_3$). Thus, instead of arranging the positioning reference signal resource elements so as to be orthogonal in time as in the subframes 501-502, 601-603 of FIGS. 6 and 7, the subframes 701, 702 of FIG. 7 illustrate frequency orthogonality through use of subsets of subcarriers to convey the positioning reference signal. Such orthogonality can be achieved through use of a subset of alternating subcarriers as illustrated in FIG. 7 or alternatively through use of a subset of adjacent subcarriers or a subset of alternating blocks of contiguous subcarriers (e.g., alternating resource blocks). To illustrate the latter alternative, positioning reference signal resource elements 704 in subframe 701 may be multiplexed onto the first through sixth subcarriers ($sub_0$ through $sub_5$) of the OFDM symbol corresponding to a particular time segment (e.g., $t_3$), while the positioning reference signal resource elements 707 in subframe 702 may be multiplexed onto the seventh through twelfth subcarriers ($sub_6$ through $sub_{ii}$) at the same time segment (e.g., $t_3$). The forgoing examples illustrate how two base station processors 316 can coordinate and share time-frequency resources within the subframe 701, 702 in a non-overlapping fashion with a pre-determined time-frequency re-use. In another example, the entire subframe bandwidth can subdivided into blocks of six physical resource blocks (PRBs). P/S-SCH extension techniques can then be applied to map the P/S-SCH sequences to each group of six PRBs but across multiple OFDM symbols. Whether or not a certain base station 203, 205 uses a six PRB segment on a particular symbol can be determined as a function of an identifier, such as a PCID or cell site ID or some other identifier associated with the base station 203, 205. In one embodiment, two OFDM symbols are collapsed into one where the second constituent OFDM symbol is a cyclically shifted version of the first constituent symbol before the respective CP of the constituent symbols are appended. The subframes 701, 702 of FIG. 7 illustrate transmission of an OFDM symbol with a duration that is twice the duration corresponding to either a normal CP OFDM symbol or an extended CP OFDM symbol. In an alternative embodiment, only a portion of twice the duration may be used for transmission with a transmission gap before and/or after the OFDM symbol.

As discussed above and unlike the subframe structure of Contribution R1-090353 to 3GPP RAN1, the positioning reference signal resource elements 704, 707 occupy only a portion (i.e., less than all) of the set of OFDM symbols forming the non-control channel portion of the subframe 701, 702. When resource elements 705, 708 containing channel-coded data bits are included, such resource elements 705, 708 may be multiplexed into OFDM symbols that are not used to convey control information or the positioning reference signal. In the embodiment illustrated in FIG. 7, data resource elements 705, 708 are multiplexed into the last five OFDM symbols of the subframe 701, 702, although the data resource elements 705, 708 may be alternatively multiplexed into other OFDM symbols of the subframe 701, 702. In alternative embodiments, either no OFDM symbol may be allocated for data transmission or a different number of OFDM symbols may be allocated for data transmission. The portion of the non-control region that may contain data transmission may be pre-determined (e.g., specified in a 3GPP specification) or indicated to the wireless communication device 201 semi-statically in a broadcast message (e.g., master information block or system information block) or through higher layer signaling.

In addition to providing frequency orthogonality, the base station processors 316 may increase the duration of and/or cyclic prefix associated with the OFDM symbols used to convey the positioning reference signal. For example, two normal OFDM symbol durations can be collapsed into one and the new duration symbol can be used to transmit an OFDM symbol with a longer cyclic prefix (e.g., 25 microseconds) than the normal and/or extended cyclic prefixes (about 5 microseconds and 16.67 microseconds, respectively) provided under the E-UTRA standard. In this case, the positioning reference signal may be especially designed to comport with the extended duration OFDM symbols. FIG. 7 illustrates use of one extended duration OFDM symbol in each subframe 701, 702 to convey the positioning reference signal. As illustrated, the duration of the OFDM symbol or symbols carrying the positioning reference signal is greater than a duration of the remaining OFDM symbols of at least the non-control channel portion of the subframe 701, 702 that may be used for transmission. In an alternative embodiment, the duration of the OFDM symbol or symbols carrying the positioning reference signal is greater than a duration of the OFDM symbols of the control channel portion of the subframe 701, 702. Alternatively, multiple extended duration and/or extended cyclic prefix OFDM symbols may be used per subframe 701, 702 to carry the positioning reference signal with a predetermined time-frequency reuse. The use of extended duration OFDM symbols to convey the positioning reference signal provides an alternative mechanism for mitigating the effects of downlink channel delay spread when such delay spread exceeds the normal or extended cyclic prefixes of OFDM symbols as provided under the E-UTRA standard. As in the subframe structures illustrated in FIGS. 5 and 6, one or more empty or blank OFDM symbols may be arranged temporally adjacent the OFDM symbols carrying the positioning reference signal. Such symbols, when included, may be populated with empty or blank resource elements 709, 710.

Those of ordinary skill in the art will readily appreciate and recognize that various other time and frequency re-use approaches for communicating positioning reference signals in overlapping or non-overlapping time resources can be envisioned taking into account the principles described herein and particularly above with respect to the subframe structures illustrated in FIGS. 5-7. Accordingly, the exemplary subframe structures discussed above with respect to FIGS. 5-7 are merely illustrative in nature and should not be construed or used to limit the present invention as defined by the appended claims.

Referring now to FIGS. 2, 3 and 5-8, operation of an exemplary wireless communication device 201 to process subframes (e.g., 501, 505, 601, 605, 701, 705) containing positioning reference signals in accordance with one embodiment of the present invention will be described. Prior to receipt of subframes containing positioning reference signals, the wireless device receiver 327 receives (801), from a base station serving the service coverage area in which the wireless device 201 is located (serving base station), one or more identifiers associated with the base stations that will be transmitting the subframes, particularly identifiers associated with base stations serving service coverage areas (e.g., cells or sectors) neighboring the service coverage area in which the wireless communication device 201 is presently located. The identifiers may be, for example, beacon codes or identifiers, offset identifiers, base station identifiers, cell site identifiers, PCIDs, GCIDs, subframe indexes, SFNs, and/or RNTIs, and may have been received as part of a broadcast control message, such as an MIB or SIB, from the serving base station. For example, the identifiers associated with the base stations 203, 205 serving neighboring service coverage areas may have been communicated as part of a neighbor cell list transmitted from the wireless device's serving base station 204 (assuming, for example, that the wireless device 201 is being serviced by base station 204 in FIG. 2). Alternatively, the identifiers may be encoded into a subframe containing the positioning reference signal (e.g., PDCCH or other control information contained in the subframe).

In addition to receiving identifiers associated with base stations serving neighboring service coverage areas (neighbor base stations), the wireless communication device receiver 327 receives (803) one or more subframes containing positioning reference signals from one or more base stations (e.g., base stations 203 and 205). For example, the wireless device 201 may receive a subframe as illustrated in FIGS. 5-7. The receiver 327 provides a baseband version of the received subframe to the processor 329 for processing in accordance with the present invention. The processor 329 first extracts a base station identifier or another identifier associated with the base station before it can receive the subframe bearing the positioning reference signal. For example, in the exemplary subframes 501-502, 601-602, and 701-702 of FIGS. 5-7, the processor 329 decodes the resource elements in a system broadcast message (e.g., system information block) to determine the identifier associated with the transmitting base station. The processor 329 may receive the identifier together with a neighbor cell list or other list of identifiers associated with neighbor base stations.

Upon receiving the subframe, the wireless device processor 329 determines (805) whether the subframe originated from a base station from which the wireless device processor 329 can process a positioning reference signal to estimate timing information (e.g., time of arrival information) useful in determining a location of the wireless device 201 and whether the subframe contains a positioning reference signal. The positioning reference signal may not be transmitted on all subframes, but rather may be transmitted in a certain subset of all subframes used for transmission by the base station. The base station may indicate to the wireless device 201 which subframes bear the positioning reference signal. The base station may indicate which subframes are used for positioning reference signal transmission through a second identifier associated with the base station. This second identifier may be pre-determined (e.g., specified in a 3GPP specification), or alternately included in a system broadcast message or a UE-specific control message (e.g., radio resource control measurement configuration message) by the base station. Subsequently, the wireless device processor 329 can determine whether a subframe contains a positioning reference signal or not. Further, the wireless device processor 329 can process a positioning reference signal on subframes that carry such a signal to estimate timing information (e.g., time of arrival of the first multipath component from the base station) useful in determining a location of the wireless device 201. When either identifier indicates that either the subframe does not contain a positioning reference signal or that the information within the subframe (e.g., a positioning reference signal) cannot be used for determining position-related timing information (e.g., the identifier does not correspond to a desired base station), the processor 329 ignores (807) the received subframe. On the other hand, when the identifier indicates that information within the subframe (e.g., a positioning reference signal) can be used for determining position-related timing information (e.g., the identifier is on a previously received neighbor cell list), the processor 329 processes the subframe and particular sets of transmission resources therein to ultimately estimate timing information (e.g., time of arrival or observed time difference of arrival information) that may be used in determining a location of the wireless device 201.

In the event that the received subframe is from a base station from which position-related timing information can be determined, the wireless device processor 329 determines (809) a set of transmission resources in a non-control channel portion of the received subframe in which a positioning reference signal (e.g., an OTDOA waveform) was transmitted based on an identifier associated with the base station. For example, the wireless device memory 331 may store a table that maps identifiers with OFDM symbol positions and characteristics (e.g., symbol durations and/or associated cyclic prefixes). The table may be updated each time the wireless device 201 receives a new neighbor cell list from the currently serving site or cell or when a new cell is detected and the neighbor cell list is updated by the wireless device 201 in an autonomous fashion.

Based on the identifier (e.g., PCID) associated with the base station from which the subframe was received, the wireless device processor 329 demultiplexes the subframe to extract the set of transmission resources (e.g., time-frequency resource elements) carrying the positioning reference signal. In other words, based on the identifier associated with the base station that transmitted the subframe and the symbol mapping stored in the wireless device memory 331, the processor 329 determines which OFDM symbol or symbols in the non-control channel portion of the frame contains the positioning reference signal. Additionally, the processor 329 determines, based on the stored mapping, whether the OFDM symbol or symbols containing the positioning reference signal are of normal duration or normal or extended cyclic prefix under the E-UTRA or LTE standard or have a special duration or associated cyclic prefix (e.g., a multiple of a normal duration or a special, lengthier cyclic prefix). The processor 329 then processes (811) the set of transmission resources containing the positioning reference signal to estimate time of arrival information associated with the positioning reference signal based on reference timing information. For example, the wireless device processor 329 may determine a time of arrival of the positioning reference signal based on a reference time or clock supplied by the wireless device's local oscillator 332. Further, the wireless device processor 329 may determine time of arrival from at least two base stations from their respective positioning reference signal transmissions based on a reference clock. In addition, the device processor 329 may compute the time difference of arrival corresponding to at least a subset of those base stations with the time of arrival of one base station as the reference.

In one embodiment, after the transmission resources containing the positioning reference signal have been processed and the timing information estimated, the wireless device processor 329 may determine (813) whether the wireless device 201 is in an autonomous location determining mode in which the wireless device processor 329 determines the wireless device's location. If the wireless device 201 is in such an autonomous location mode, the wireless device processor 329 determines (815) the wireless device's location based on the timing information computed for subframes received from multiple (two or more) base stations serving neighboring service coverage areas. In this case, the wireless device memory 331 stores the fixed locations of the system base stations and uses those fixed locations together with time of arrival information to determine its location using known triangulation or trilateration methods. Alternatively, if the wireless device 201 is not in an autonomous location determining mode and its location is to be determined by another device, such as the wireless system's location server 207, the wireless device communicates (817) the timing information (e.g., estimated times of arrival of positioning reference signals received from two or more neighbor base stations) to the location-determining device via the wireless device's serving base station.

The wireless device 201 may identify newly detectable cells on a certain carrier frequency autonomously and send a measurement report to the serving base station. Alternately, the serving base station may send a neighbor cell list re-configuration message to the wireless device 201. Either way, the wireless device 201 may update its neighbor cell list. The serving base station may also send the wireless device 201 a UE-specific configuration message (e.g., radio resource control measurement configuration message) requesting that the wireless device 201 determine the observed time difference of arrival (OTDA) corresponding to a subset of the neighboring base stations and report the OTDA determinations. Thus, the wireless device 201 may determine the observed time difference of arrival corresponding to a subset of the configured neighboring base stations. The wireless device 201 may then report these measurements to the serving base station.

To provide a further example of the operation of the wireless device processor 329 to assist in determining the wireless device's location, consider the system 200 of FIG. 2 under the circumstances in which base station 204 is providing wireless service to the wireless device 201 and base stations 203 and 205 are providing wireless service to service coverage areas (e.g., cells or sectors) neighboring the service coverage area serviced by base station 204. In this case, the wireless device may receive subframes from both neighbor base stations 203, 205 (e.g., subframes configured as illustrated in FIG. 5, FIG. 6, or FIG. 7). In this embodiment, each subframe includes a one millisecond (1 ms) block of resource elements that are divided in time across a group of subcarriers to form OFDM symbols. Each resource element occupies a predetermined amount of time (e.g., about 70 microseconds) on its respective subcarrier. The OFDM symbols of each subframe are arranged into a first set of OFDM symbols into which control information has been encoded and a second set of OFDM symbols into which information other than control information has been encoded. Such other information includes a positioning reference signal and, optionally, data. In other words, each subframe may be configured to support a control channel (e.g., PDCCH), a synchronization channel (e.g., a P/S-SCH), and a data channel (e.g., a PDSCH).

After receiving the subframes, the wireless device processor 329 determines, for each subframe, a set of resource elements (and analogously a set of OFDM symbols) in which a positioning reference signal was transmitted based on an identifier associated with the base station 203, 205 from which the particular subframe was received. The set of OFDM symbols carrying the positioning reference signal from base station 203 is preferably orthogonal to the set of OFDM symbols carrying the positioning reference signal from base station 205. To increase the likelihood that such OFDM symbols remain orthogonal during unfavorable downlink channel conditions, such as when the overall delay spread of the downlink channel (i.e., propagation delay plus multipath delay spread) as seen from the wireless device 201 exceeds a cyclic prefix (CP) length for normal CP (approximately five microseconds) or extended CP (approximately 16.67 microseconds) as provided under the E-UTRA standard, each subframe may include one or more blank or empty OFDM symbols positioned adjacent the OFDM symbols carrying the positioning reference signals such that the OFDM symbols carrying the positioning reference signals are different for each base station 203, 205 (e.g., as illustrated in FIG. 5 or FIG. 6). Alternatively, instead of separating the OFDM symbols in time between neighboring base stations 203, 205, the resource elements containing the positioning reference signal may be arranged within one or more common OFDM symbols such that there is frequency separation between the positioning reference signal resource elements (e.g., as illustrated in FIG. 7). In the latter case, the duration of the OFDM symbols carrying the positioning reference signal may be increased as compared to the duration of other OFDM symbols in the non-control channel portion of the subframe. In either event, the OFDM symbol or symbols carrying the positioning reference signal in each subframe occupy only a portion (less than all) of the OFDM symbols in the non-control channel portion of the subframe.

The difference in positioning of the positioning reference signal resource elements and/or OFDM symbols either in time or frequency is stored in the wireless device memory 331 and may be updated on a regular basis in connection with receipt of updated neighbor cell lists from the serving base station 204. As a result, the wireless device processor 329 may map the identifier of the base station 203, 205 that transmitted the subframe to the stored information mapping identifiers associated with base stations to positioning of resource elements and/or OFDM symbols carrying positioning reference signals to determine the location and/or characteristics (e.g., duration and/or cyclic prefix) of such resource elements and/or OFDM symbols within a particular received subframe.

After the wireless device processor 329 has determined the sets of resource elements in which the positioning reference signals were transmitted in the subframes received from the base stations 203, 205 based on identifiers associated with the base stations 203, 205, the wireless device processor 329 processes the sets of resource elements to estimate times of arrival of the respective positioning reference signals based on a local oscillator frequency of the wireless device's local oscillator 332. The wireless device processor 329 then provides the estimated times of arrival in a message (e.g., in a radio resource control measurement report message) to the wireless device transmitter 325 for transmission on the uplink to the serving base station 204 and then ultimately to the location server 207 for determination of the wireless device's location. Alternatively, as discussed above, when the wireless device processor 329 has been programmed to autonomously estimate the wireless device's location, the wireless device processor 329 may compute its own location based on the estimated times of arrival and other information as may be provided to the wireless device 201 and/or stored in the wireless device memory 331 (e.g., base station locations, transmission times of the subframes, channel conditions, and so forth as is known in the art).

The instructions illustrated in FIG. 4 for controlling operation of the base station processor 316 (e.g., logic flow blocks 401-413) may be implemented as programming instructions, which are stored in base station memory 318 and executed at appropriate times by the base station processor 316. Similarly, the instructions illustrated in FIG. 8 for controlling operation of the wireless device processor 329 (e.g., logic flow blocks 805-815) may be implemented as programming instructions, which are stored in wireless device memory 331 and executed at appropriate times by the wireless device processor 329.

The present invention encompasses an apparatus and method for communicating positioning reference signals based on an identifier associated with a base station. With this invention, orthogonality of OFDM symbols carrying positioning reference signals which have been transmitted by base stations of neighboring cells or sectors is maintained even under conditions causing substantial downlink channel delay spread as perceived by a wireless device. By utilizing less than all of the OFDM symbols in the non-control channel portion of a downlink subframe to convey the positioning reference signal, empty OFDM symbols are made available to absorb the effects of delay spreads that are greater than the cyclic prefix of the OFDM symbols carrying the position reference signals, thereby maintaining the orthogonality of DFT precoding. Alternatively, by increasing the duration of or cyclic prefix associated with the OFDM symbol or symbols carrying the positioning reference signal, such increase in duration or cyclic prefix offsets increased delay spreads incurred under various network conditions and enables the orthogonality of DFT precoding to be maintained. Identifiers associated with the base stations transmitting the subframes are used by the wireless communication device to indicate the positioning and/or characteristics of resource elements and/or associated OFDM symbols carrying a positioning reference signal within a subframe to facilitate the maintenance of orthogonality while insuring proper demultiplexing and subsequent processing of the resource elements.

As detailed above, embodiments of the present invention reside primarily in combinations of method steps and apparatus components related to communicating positioning reference signals to aid in determining a geographic location of a wireless communication device. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as "first" and "second," "top" and "bottom," and the like may be used solely to distinguish one entity or action from another entity or action without necessarily requiring or implying any actual such relationship or order between such entities or actions. The terms "comprises," "comprising," and any other variations thereof are intended to cover a non-exclusive inclusion, such that a process, method, article, or apparatus that comprises a list of elements does not include only those elements but may include other elements not expressly listed or inherent to such process, method, article, or apparatus. The term "plurality of" as used in connection with any object or action means two or more of such object or action. A claim element proceeded by the article "a" or "an" does not, without more constraints, preclude the existence of additional identical elements in the process, method, article, or apparatus that includes the element.

It will be appreciated that embodiments of the base station 301 and the wireless communication device 201 described herein may be comprised of one or more conventional processors and unique stored program instructions that control the processor(s) to implement, in conjunction with certain non-processor circuits, some, most, or all of the functions of the base station 301 and the wireless communication device 201 and their operational methods as described herein. The non-processor circuits may include, but are not limited to, the transmitters 312, 325, the receivers 314, 327, the antennas 304-307, 39-310, 320, 322-323, the local oscillator 332, the display 333, the user interface 335, memory 318, 331, and the alerting mechanism 337 described above, as well as filters, signal drivers, clock circuits, power source circuits, user input devices, and various other non-processor circuits. As such, the functions of these non-processor circuits may be interpreted as steps of a method in accordance with one or more embodiments of the present invention. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been generally described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions or programs and integrated circuits without undue experimentation.

In the foregoing specification, specific embodiments of the present invention have been described. However, one of ordinary skill in the art will appreciate that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

We claim:

1. A wireless communication device operable in a wireless communication system that includes at least one base station, the wireless communication device comprising:

a receiver operable to receive at least a section of a subframe from a base station, the subframe including a plurality of transmission resources multiplexed onto subcarriers of a plurality of orthogonal frequency division multiplexed (OFDM) symbols, each transmission resource of the plurality of transmission resources occupying a predetermined amount of time on a respective one of the subcarriers, the plurality of OFDM symbols being arranged into at least a first set of OFDM symbols that includes a positioning reference signal and a second set of OFDM symbols that does not include the positioning reference signal; and a processor operably coupled to the receiver, the processor operable to:
determine, based on an identifier associated with the base station, a set of transmission resources over which the positioning reference signal was transmitted, the set of transmission resources constituting at least a portion of the first set of OFDM symbols; and
process the set of transmission resources to estimate timing information associated with the positioning reference signal.

2. The wireless communication device of claim 1, wherein the processor is further operable to:
determine a time of arrival of the positioning reference signal based on reference timing information and the estimated timing information.

3. The wireless communication device of claim 2, wherein the receiver is operable to receive transmissions from a plurality of base stations, the wireless communication device further comprising:
a transmitter operably coupled to the processor and operable to communicate at least the time of arrival to at least one of the plurality of base stations.

4. The wireless communication device of claim 1, wherein the subframe forms part of a radio frame and wherein the processor is further operable to:
determine, based on the identifier, whether the subframe includes transmission resources corresponding to the positioning reference signal prior to determining the set of transmission resources.

5. The wireless communication device of claim 1, wherein a cyclic prefix associated with each OFDM symbol in the portion of the first set of OFDM symbols is identical.

6. The wireless communication device of claim 1, wherein the first set of OFDM symbols includes at least a first subset of OFDM symbols and a second subset of OFDM symbols, wherein the set of transmission resources form the first subset of OFDM symbols, and wherein a duration of each OFDM symbol of the first subset of OFDM symbols is greater than a duration of each OFDM symbol of the second set of OFDM symbols.

7. The wireless communication device of claim 6, wherein a cyclic prefix associated with each OFDM symbol of the first subset of OFDM symbols is greater than 16.67 microseconds.

8. The wireless communication device of claim 1, wherein the identifier is derived from at least one of an offset identifier, a cell site identifier, a physical cell identifier, a global cell identifier, a symbol index, a slot index, a subframe index, a system frame number, and a radio network transaction identifier.

9. The wireless communication device of claim 8, wherein the identifier associated with the base station is identical to identifiers associated with a plurality of other base stations.

10. The wireless communication device of claim 9, wherein the base station and the plurality of other base stations are co-located.

11. A method for a wireless communication device to at least determine position-related timing information, the wireless communication device operating in a wireless communication system that includes a plurality of base stations, the method comprising:
  receiving at least a section of a subframe transmitted by a first base station of the plurality of base stations, the subframe including a plurality of transmission resources multiplexed onto subcarriers of a plurality of orthogonal frequency division multiplexed (OFDM) symbols, each transmission resource of the plurality of transmission resources occupying a predetermined amount of time on a respective one of the subcarriers, the plurality of OFDM symbols being arranged into a first set of OFDM symbols that includes a positioning reference signal and a second set of OFDM symbols that does not include a positioning reference signal;
  determining, based on an identifier associated with the first base station, a set of transmission resources over which the positioning reference signal was transmitted, the set of transmission resources constituting a portion of the first set of OFDM symbols; and
  processing the set of transmission resources to estimate timing information associated with the positioning reference signal.

12. The method of claim 11, further comprising:
  determining a time of arrival of the positioning reference signal based on reference timing information and the estimated timing information.

13. The method of claim 12, further comprising:
  communicating at least the time of arrival to at least one of the plurality of base stations.

14. The method of claim 11, wherein each of the plurality of base stations provides wireless communication service within a respective service coverage area, the method further comprising:
  receiving the identifier from a second base station prior to receipt of the subframe from the first base station.

15. The method of claim 14, wherein receiving the identifier comprises:
  receiving a list of identifiers associated with at least some of the plurality of base stations.

16. The wireless communication device of claim 14, wherein receiving the identifier comprises:
  receiving the identifier in a broadcast message from the second base station.

17. A method for a wireless communication device to determine time of arrival information from which a location of the wireless communication device may be estimated, the wireless communication device operating in a wireless communication system that includes a plurality of base stations and a location server, each of the plurality of base stations providing wireless communication service within a respective service coverage area, the location server being operable to determine locations of wireless communication devices within a coverage area of the wireless communication system, the wireless communication device receiving wireless communication service from a first base station of the plurality of base stations, the method comprising:
  receiving a first subframe transmitted by a second base station of the plurality of base stations, the first subframe including a first plurality of resource elements that are divided in time across a first plurality of subcarriers to form a first plurality of orthogonal frequency division multiplexed (OFDM) symbols, each resource element of the first plurality of resource elements occupying a predetermined amount of time on a respective one of the first plurality of subcarriers, the first plurality of OFDM symbols being arranged into a first set of OFDM symbols that includes a first positioning reference signal and a second set of OFDM symbols that does not include the first positioning reference signal;
  receiving a second subframe transmitted by a third base station of the plurality of base stations, the second subframe including a second plurality of resource elements that are divided in time across a second plurality of subcarriers to form a second plurality of orthogonal frequency division multiplexed (OFDM) symbols, each resource element of the second plurality of resource elements occupying a predetermined amount of time on a respective one of the second plurality of subcarriers, the second plurality of OFDM symbols being arranged into a third set of OFDM symbols that includes a second positioning reference signal and a fourth set of OFDM symbols that does not include the second positioning reference signal;
  determining, based on an identifier associated with the second base station, a first set of resource elements over which the first positioning reference signal was transmitted in the first subframe, the first set of resource elements constituting a portion of the first set of OFDM symbols;
  determining, based on an identifier associated with the third base station, a second set of resource elements over which the second positioning reference signal was transmitted in the second subframe, the second set of resource elements constituting a portion of the third set of OFDM symbols, wherein the portion of the third set of OFDM symbols containing the second positioning reference signal is different than and orthogonal to the portion of the first set of OFDM symbols containing the first positioning reference signal;
  processing the first set of resource elements to estimate a first time of arrival of the first positioning reference signal based on a local oscillator frequency of the wireless communication device;
  processing the second set of resource elements to estimate a second time of arrival of the second positioning reference signal based on the local oscillator frequency; and
  communicating the first time of arrival and the second time of arrival to the location server via the first base station.

18. A method for a wireless communication device to at least determine position-related timing information, the wireless communication device operating in a wireless communication system that includes a plurality of base stations, the method comprising:
  receiving at least a section of a subframe transmitted by a first base station of the plurality of base stations, the subframe including a plurality of transmission resources multiplexed onto subcarriers of a plurality of orthogonal frequency division multiplexed symbols, each transmission resource of the plurality of transmission resources occupying a predetermined amount of time on a respective one of the subcarriers, the plurality of transmission resources being arranged into at least a first set of transmission resources that includes a positioning reference signal and a second set of transmission resources that includes information othan than the positioning reference signal, the second set of transmission resources being different than the first set of transmission resources;

determining, based on an identifier associated with the first base station, the first set of transmission resources over which the positioning reference signal was transmitted; and processing the first set of transmission resources to estimate timing information associated with the positioning reference signal.

19. The method of claim 18, wherein the plurality of transmission resources includes a third set of transmission resources over which at least one of control information, synchronization information, and one or more additional reference signals was transmitted, the third set of transmission resources being different than the first set of transmission resources and the second set of transmission resources, the method further comprising:

determining the third set of transmission resources over which at least one of control information, synchronization information, and one or more additional reference signals was transmitted; and processing the third set of transmission resources to recover the at least one of control information, synchronization information, and one or more additional reference signals.

20. The method of claim 19, wherein the at least one of control information, synchronization information, and one or more additional reference signals includes at least one of a physical downlink control channel (PDDCH), a physical control format indicator channel (PCFICH), a physical hybrid automatic repeat request indicator channel (PHICH), a broadcast channel, a synchronization channel, a cell-specific reference signal, and a user equipment (UE) specific reference signal.

21. The method of claim 18, wherein the identifier is derived from at least one of an offset identifier, a cell site identifier, a physical cell identifier, a global cell identifier, a symbol index, a slot index, a subframe index, a system frame number, and a radio network transaction identifier.

22. The method of claim 21, wherein the offset identifier is used to derive a starting point offset for extracting a subsequence of a reference quadrature phase shift keying (QPSK) sequence.

23. A wireless communication device operable in a wireless communication system that includes at least one base station, the wireless communication device comprising:

a receiver operable to receive at least a section of a subframe from a base station, the subframe including a plurality of transmission resources multiplexed onto subcarriers of a plurality of orthogonal frequency division multiplexed (OFDM) symbols, each transmission resource of the plurality of transmission resources occupying a predetermined amount of time on a respective one of the subcarriers, the plurality of transmission resources being arranged into at least a first set of transmission resources that includes a positioning reference signal and a second set of transmission resources that includes information other than the positioning reference signal, the second set of transmission resources being different than the first set of transmission resources; and a processor operably coupled to the receiver, the processor operable to:
  determine, based on an identifier associated with the base station, the first set of transmission resources over which the positioning reference signal was transmitted; and
  process the first set of transmission resources to estimate timing information associated with the positioning reference signal.

24. The wireless communication device of claim 23, wherein the plurality of transmission resources includes a third set of transmission resources over which at least one of control information, synchronization information, and one or more additional reference signals was transmitted, the third set of transmission resources being different than the first set of transmission resources and the second set of transmission resources, and wherein the processor is further operable to:
  determine the third set of transmission resources over which the at least one of control information, synchronization information, and one or more additional reference signals was transmitted; and
  process the third set of transmission resources to recover the at least one of control information, synchronization information, and one or more additional reference signals.

25. The wireless communication device of claim 24, wherein the at least one of control information, synchronization information, and one or more additional reference signals includes at least one of a physical downlink control channel (PDDCH), a physical control format indicator channel (PCFICH), a physical hybrid automatic repeat request indicator channel (PHICH), a broadcast channel, a synchronization channel, a cell-specific reference signal, and a user equipment (UE) specific reference signal.

26. The wireless communication device of claim 23, wherein the identifier is derived from at least one of an offset identifier, a cell site identifier, a physical cell identifier, a global cell identifier, a symbol index, a slot index, a subframe index, a system frame number, and a radio network transaction identifier.

27. The wireless communication device of claim 26, wherein the offset identifier is used to derive a starting point offset for extracting a subsequence of a reference quadrature phase shift keying (QPSK) sequence.

28. The method of claim 18, wherein the second set of transmission resources includes channel-coded data, the method further comprising:
  determining the second set of transmission resources over which the channel-coded data was transmitted; and
  processing the second set of transmission resources to recover the channel-coded data.

29. The wireless communication device of claim 23, wherein the second set of transmission resources includes channel-coded data and wherein the processor is further operable to:
  determine the second set of transmission resources over which the channel-coded data was transmitted; and
  process the second set of transmission resources to recover the channel-coded data.

* * * * *